United States Patent
Manolakos et al.

(10) Patent No.: US 11,460,532 B2
(45) Date of Patent: Oct. 4, 2022

(54) METHODS AND APPARATUS FOR HYBRID POSITIONING MEASUREMENT AND REPORTING USING DIFFERENT TYPES OF PHYSICAL SIGNALS

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/357,857

(22) Filed: Jun. 24, 2021

(65) Prior Publication Data

US 2022/0065978 A1    Mar. 3, 2022

Related U.S. Application Data

(60) Provisional application No. 63/071,212, filed on Aug. 27, 2020.

(51) Int. Cl.
| | |
|---|---|
| H04W 24/10 | (2009.01) |
| H04W 72/04 | (2009.01) |
| G01S 5/02 | (2010.01) |
| H04L 5/00 | (2006.01) |

(52) U.S. Cl.
CPC .......... *G01S 5/0236* (2013.01); *H04L 5/0048* (2013.01); *H04W 24/10* (2013.01); *H04W 72/0453* (2013.01)

(58) Field of Classification Search
CPC .......................... H04W 64/003; H04W 64/00
See application file for complete search history.

(56) References Cited

U.S. PATENT DOCUMENTS

| | | | | |
|---|---|---|---|---|
| 2020/0374850 | A1* | 11/2020 | Khoryaev | H04W 72/048 |
| 2022/0132460 | A1* | 4/2022 | Shimoda | G01S 1/0428 |
| 2022/0209912 | A1* | 6/2022 | Siomina | H04L 5/0094 |

FOREIGN PATENT DOCUMENTS

| | | |
|---|---|---|
| WO | WO-2020033894 A1 | 2/2020 |
| WO | WO-2020150589 A1 | 7/2020 |
| WO | WO-2020167902 A1 | 8/2020 |

OTHER PUBLICATIONS

International Search Report and Written Opinion—PCT/US2021/042569—ISA/EPO—dated Nov. 17, 2021.

* cited by examiner

*Primary Examiner* — Kevin Kim
(74) *Attorney, Agent, or Firm* — Weaver Austin Villeneuve & Sampson LLP

(57) ABSTRACT

A user equipment uses positioning reference signals (PRS) and non-PRS signals for position measurements. The non-PRS signals may be downlink and sidelink signals wherein the non-PRS are downlink or sidelink signals that are transmitted for purposes unrelated to positioning. Positioning assistance data is provided to the UE that associates the non-PRS signals with PRS-IDs. The association of the non-PRS signals to the PRS-IDs may be provided by a location server or serving base station. After performing positioning measurements using non-PRS signals, the UE reports measurement information using the PRS-IDs to identify the non-PRS signals used to generate the positioning measurements.

72 Claims, 16 Drawing Sheets

1400

1402

Obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS

1404

Receive a report of measurement information from the UE, the measurement information using the PRS-IDs associated with the non-PRS to identify the non-PRS used for the positioning measurements performed by the UE

*FIG. 14*

METHODS AND APPARATUS FOR HYBRID POSITIONING MEASUREMENT AND REPORTING USING DIFFERENT TYPES OF PHYSICAL SIGNALS

CLAIM OF PRIORITY UNDER 35 U.S.C. § 119

This application claims under 35 USC § 119 the benefit of and priority to U.S. Provisional Application No. 63/071,212, filed Aug. 27, 2020, entitled "METHODS AND APPARATUS FOR HYBRID POSITIONING MEASUREMENT AND REPORTING USING DIFFERENT TYPES OF PHYSICAL SIGNALS," which is assigned to the assignee hereof and is incorporated herein by reference in its entirety.

BACKGROUND

Field

Subject matter disclosed herein relates to estimation of a location of a mobile device and more particularly to informing a mobile device when broadcasted positioning assistance data has changed to help enable location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). Assistance data is sent to a mobile device to assist in acquiring and measuring signals and/or in computing a location estimate from the measurements, which may be useful for acquiring PRS for location determination. A mobile device acquiring PRSs transmitted by different base stations may deliver signal-based measurements to a location server, which may be part of an Evolved Packet Core (EPC) or 5G Core Network (SGCN), for use in computing a location estimate of the mobile device. For example, a UE may generate positioning measurements from the downlink (DL) PRS such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT).

Alternatively, a mobile device may compute an estimate of its own location using various positioning methods. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

Positioning reference signals (PRS) are transmitted, e.g., during periodically or dynamically assigned positioning occasions, between non-positioning related signaling, e.g., signaling related to control and communication. Thus, the use of PRS for positioning is limited to positioning occasions. Improvements to positioning capabilities may be desirable.

SUMMARY

A user equipment uses positioning reference signals (PRS) and non-PRS signals for position measurements. The non-PRS signals may be downlink and sidelink signals wherein the non-PRS are downlink or sidelink signals that are transmitted for purposes unrelated to positioning. Positioning assistance data is provided to the UE that associates the non-PRS signals with PRS-IDs. The association of the non-PRS signals to the PRS-IDs may be provided by a location server or serving base station. After performing positioning measurements using non-PRS signals, the UE reports measurement information using the PRS-IDs to identify the non-PRS signals used to generate the positioning measurements.

In one implementation, a A method performed by a user equipment (UE) for supporting positioning of the UE in a wireless network, includes receiving positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; performing positioning measurements based on the positioning assistance data using the non-PRS; and sending a report of measurement information to a network node in the wireless network, the measurement information using the PRS-IDs associated with the non-PRS to identify the non-PRS used for the positioning measurements.

In one implementation, a user equipment (UE) configured to support positioning of the UE in a wireless network, includes a wireless transceiver configured to wirelessly communicate with entities in the wireless network; at least one memory; at least one processor coupled to the wireless transceiver and the at least one memory, wherein the at least one processor is configured to: receive positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; perform positioning measurements based on the positioning assistance data using the non-PRS; and send a report of measurement information to a network node in the wireless network, the measurement information using the PRS-IDs associated with the non-PRS to identify the non-PRS used for the positioning measurements.

In one implementation, a user equipment (UE) configured for supporting positioning of the UE in a wireless network, includes means for receiving positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; means for performing positioning measurements based on the positioning assistance data using the non-PRS; and means for sending a report of measurement information to a network node in the wireless network, the measurement information using the PRS-IDs associated with the non-PRS to identify the non-PRS used for the positioning measurements.

In one implementation, a non-transitory computer-readable storage medium including program code stored thereon, the program code is operable to configure at least one processor in a user equipment (UE) for supporting positioning of the UE in a wireless network, the program code comprising instructions to: receive positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; perform positioning measurements based on the positioning assistance data using the non-PRS; and send a report of measurement information to a network node in the wireless network, the measurement information using the PRS-IDs associated with the non-PRS to identify the non-PRS used for the positioning measurements.

In one implementation, a method performed by a location server in wireless network for supporting positioning of a user equipment (UE) the wireless network, includes obtaining a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and receiving a report of measurement information from the UE, the measurement information using the PRS-IDs associated with the non-PRS to identify the non-PRS used for the positioning measurements performed by the UE.

In one implementation, a location server configured to support positioning of a user equipment (UE) in a wireless network, includes an external interface configured to communicate with entities in the wireless network; at least one memory; at least one processor coupled to the external interface and the at least one memory, wherein the at least one processor is configured to: obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and receive a report of measurement information from the UE, the measurement information using the PRS-IDs associated with the non-PRS to identify the non-PRS used for the positioning measurements performed by the UE.

In one implementation, a location server in wireless network for supporting positioning of a user equipment (UE) the wireless network, includes means for obtaining a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and means for receiving a report of measurement information from the UE, the measurement information using the PRS-IDs associated with the non-PRS to identify the non-PRS used for the positioning measurements performed by the UE.

In one implementation, a non-transitory computer-readable storage medium including program code stored thereon, the program code is operable to configure at least one processor in a location server in wireless network for supporting positioning of a user equipment (UE) the wireless network, the program code comprising instructions to: obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and receive a report of measurement information from the UE, the measurement information using the PRS-IDs associated with the non-PRS to identify the non-PRS used for the positioning measurements performed by the UE.

In one implementation, a method performed by a serving base station for a user equipment (UE) in a wireless network for supporting positioning of the UE in the wireless network, includes sending a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and sending a positioning assistance data to the UE comprising the association of non-PRS with PRS-IDs, wherein the UE performs positioning measurements using the non-PRS.

In one implementation, a base station configured to support positioning of a user equipment (UE) in a wireless network, includes an external interface configured to wirelessly communicate with entities in the wireless network; at least one memory; at least one processor coupled to the external interface and the at least one memory, wherein the at least one processor is configured to: send a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and send a positioning assistance data to the UE comprising the association of non-PRS with PRS-IDs, wherein the UE performs positioning measurements using the non-PRS.

In one implementation, a serving base station for a user equipment (UE) in a wireless network for supporting positioning of the UE in the wireless network, including means for sending a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and means for sending a positioning assistance data to the UE comprising the association of non-PRS with PRS-IDs, wherein the UE performs positioning measurements using the non-PRS.

In one implementation, a non-transitory computer-readable storage medium including program code stored thereon, the program code is operable to configure at least one processor in a serving base station for a user equipment (UE) in a wireless network for supporting positioning of the UE in the wireless network, the program code comprising instructions to: send a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and send a positioning assistance data to the UE comprising the association of non-PRS with PRS-IDs, wherein the UE performs positioning measurements using the non-PRS.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 14 shows a flowchart for an exemplary method for supporting positioning of a location server in a wireless network performed by the UE.

DETAILED DESCRIPTION

Figure 1:
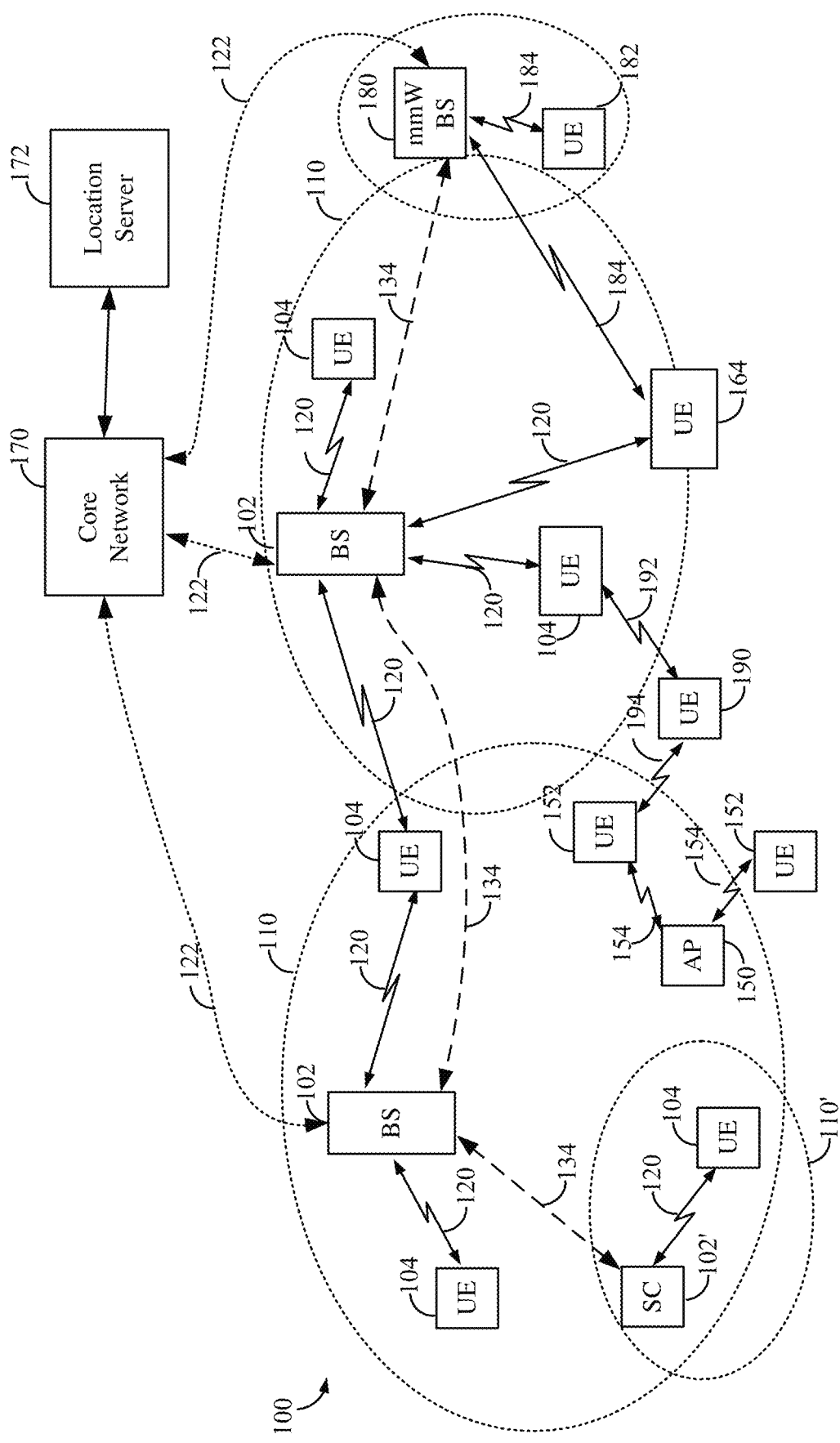
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires a dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbour base stations or Transmission and Reception Points (TRPs). Several configurations are supported to enable a variety of deployments (indoor, outdoor, sub-6, mmW). To support PRS beam operation, beam sweeping is additionally supported for PRS. Table 1 below illustrates 3GPP release numbers (e.g., Re1.16 or Re1.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel.16 DL PRS | DL RSTD | DL-TDOA |
| Rel.16 DL PRS | DL PRS RSRP | DL-TDOA, DL-AoD, Multi-RTT |
| Rel.16 DL PRS/Rel.16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM) | E-CID |

In addition to PRS signals, a UE, however, receives many other signals that are not intended for positioning. For example, a UE receives control and communication signals, such as Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH). Additionally, a UE may receive downlink signals from base stations as well as sidelink signals from other UEs.

In an implementation, a UE may perform positioning measurements using non-PRS signals, e.g., using downlink or sidelink signals that are transmitted for purposes unrelated to positioning, such as SSB, TRS, CSI-RS, PDSCH, DM-RS, PDCCH, PSSCH, or PSCCH. To support positioning using non-PRS signals, positioning assistance data may be provided that includes a list of PRS identifiers (PRS-IDs) and associates the non-PRS signals with PRS-IDs for positioning purposes. After the UE performs the positioning measurements using the non-PRS signals, the measurement information may be reported using the PRS-IDs associate with the non-PRS signals to identify which non-PRS signals were used for the positioning measurements. In some implementations, a location server may provide the assistance data to the UE, while in other implementations, a serving base station may provide coordinate with the location server and may provide, e.g., at least the assistance data that associates the non-PRS signals with PRS-IDs.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
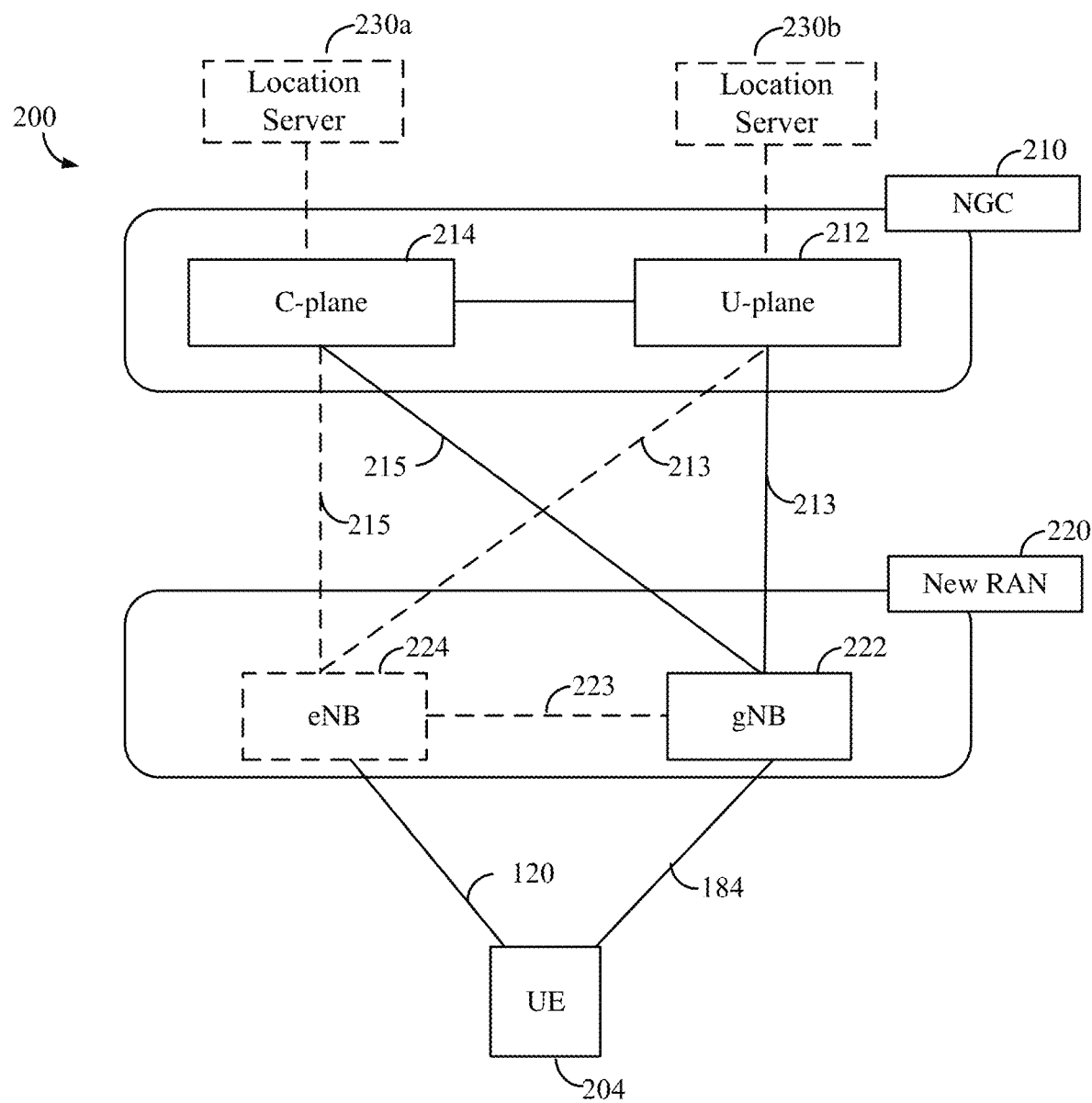
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
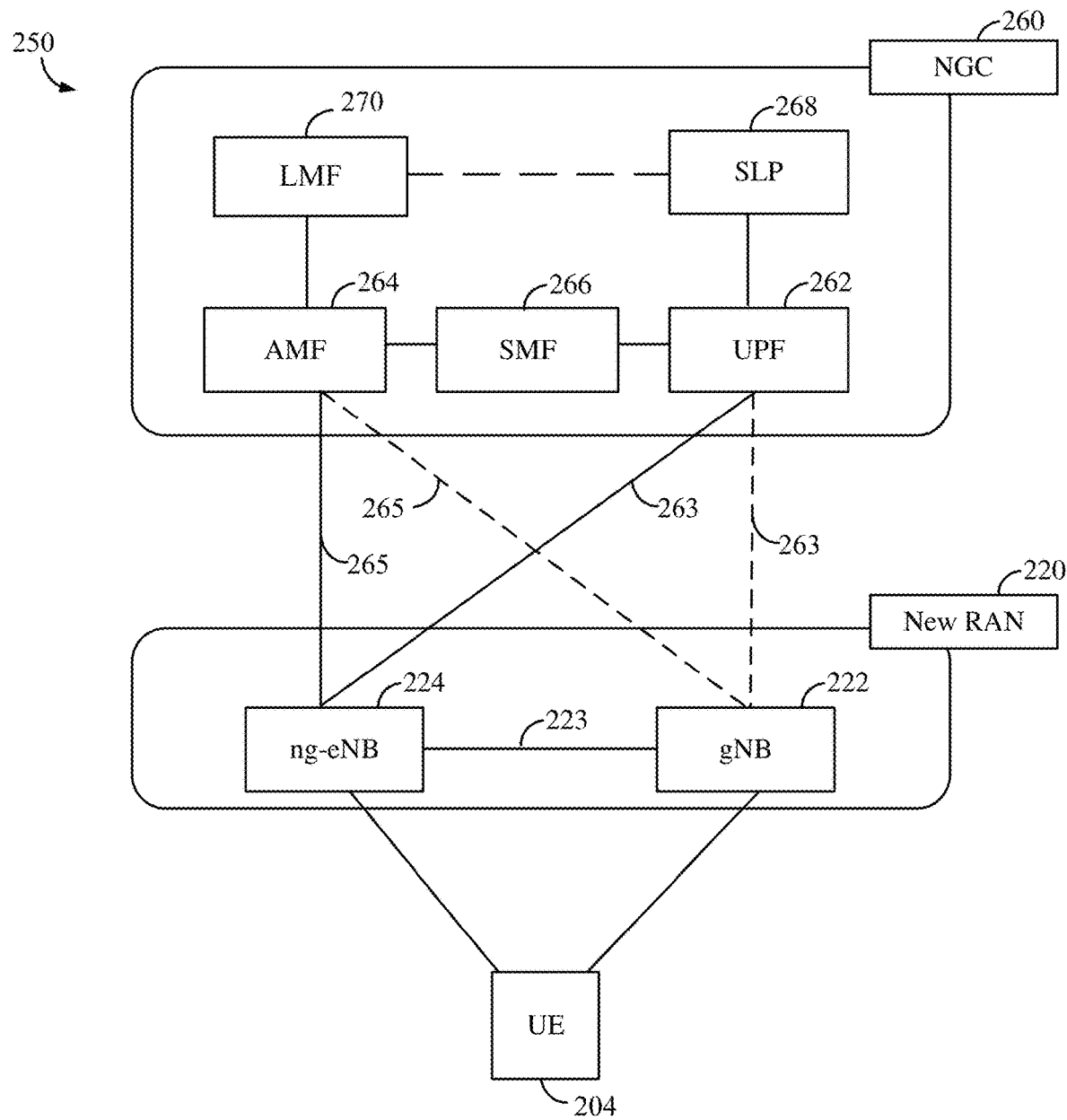

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
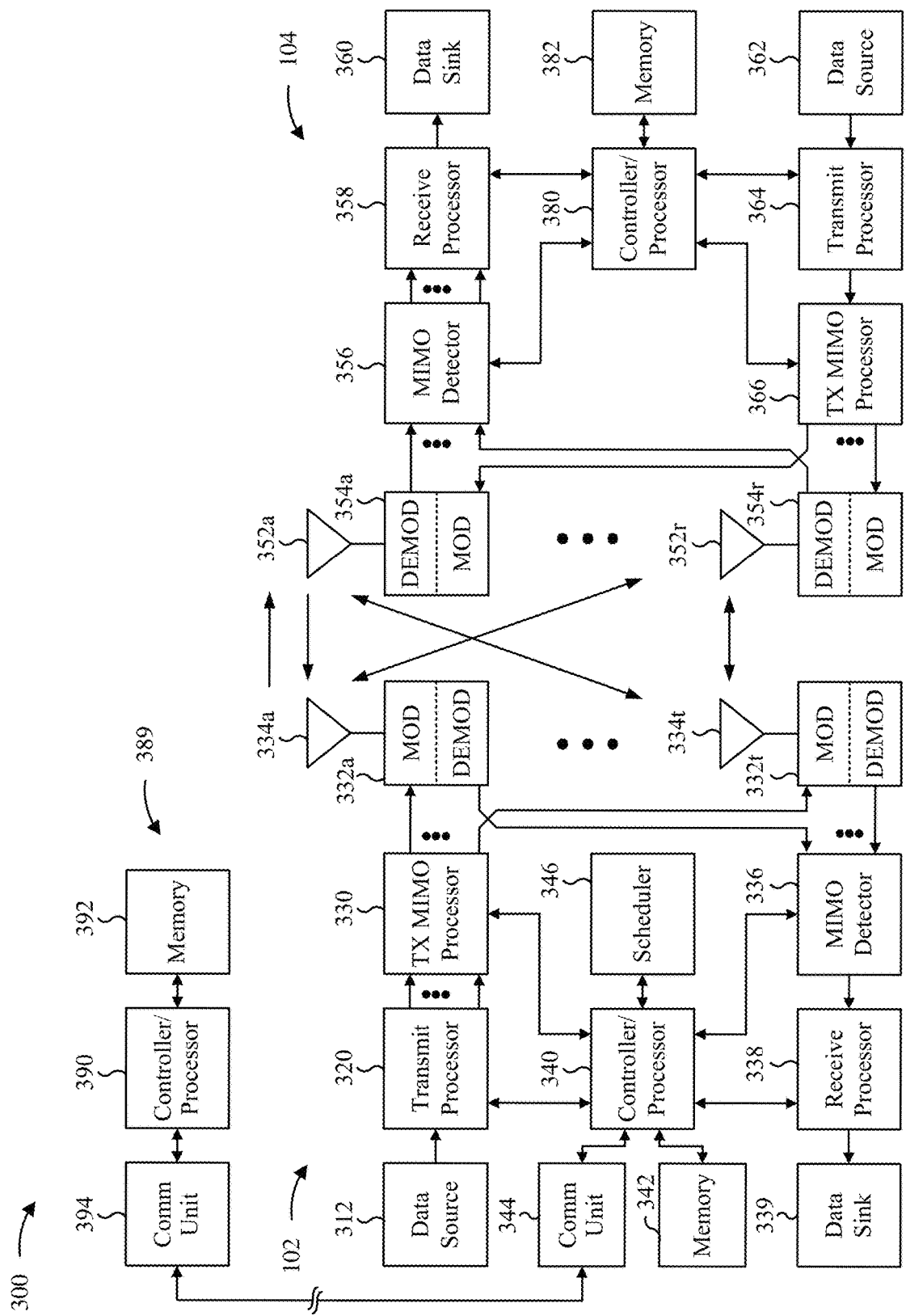
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, controller 390 of network controller 389, which may be location server 172, and/or any other component(s) of FIG. 3 may perform one or more techniques associated broadcasting positioning assistance data in a differential manner, as described in more detail elsewhere herein. For example, controller/processor 340 of base station 102, controller 390 of network controller 389, controller/processor 380 of UE 104, and/or any other component(s) of FIG. 3 may perform or direct operations of, for example, process 1300, 1400, and 1500 of FIGS. 13, 14, and 15, and/or other processes as described herein. Memories 342, 382, and 392 may store data and program codes for base station 102, UE 104, and network controller 389, respectively. In some aspects, memory 342 and/or memory 382 and/or memory 392 may comprise a non-transitory computer-readable medium storing one or more instructions for wireless communication. For example, the one or more instructions, when executed by one or more processors of the base station 102 network controller 389, and/or the UE 104, may perform or direct operations of, for example, process 1300, 1400, and 1500 of FIGS. 13, 14, and 15 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
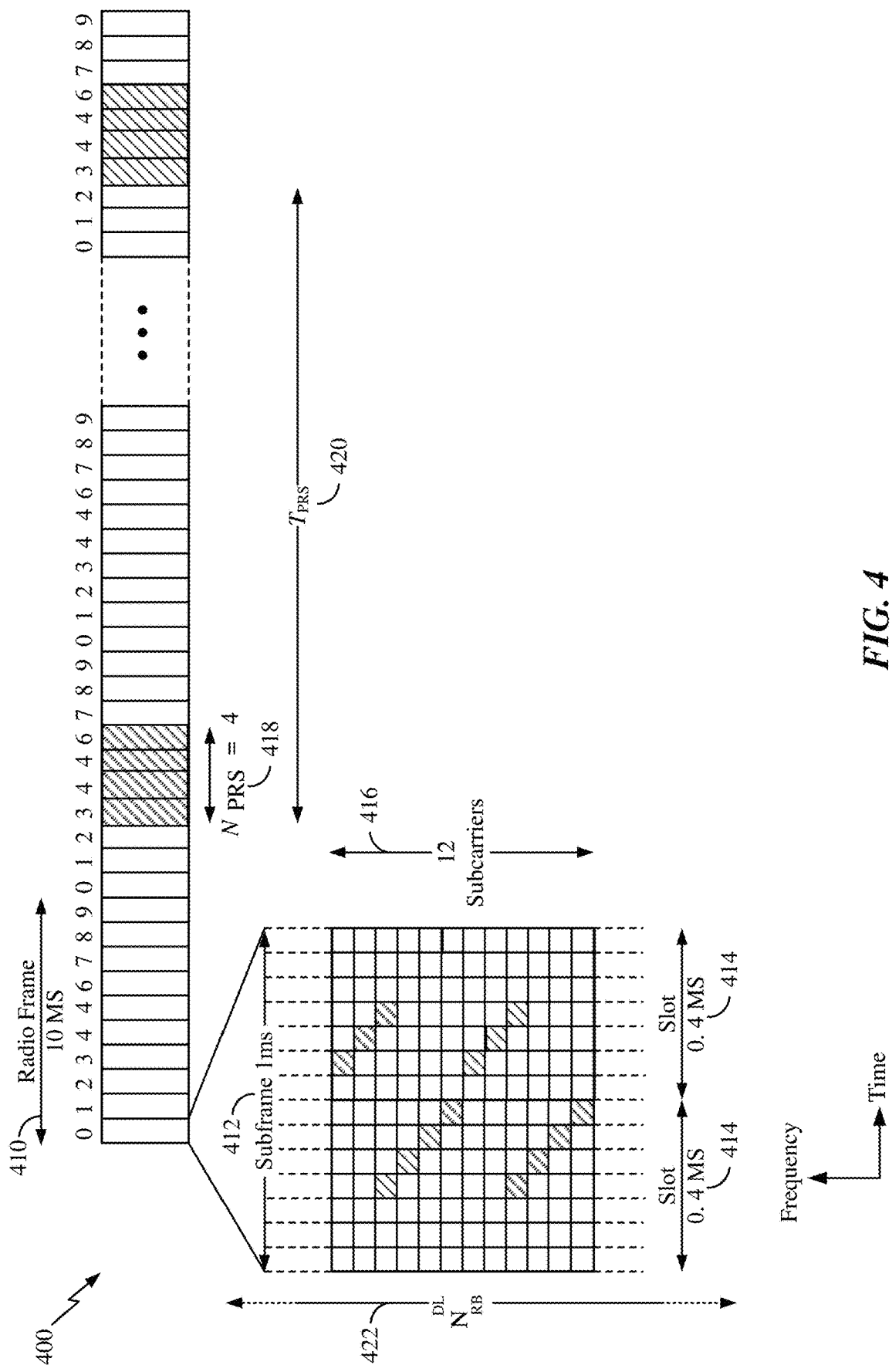
FIG. 4 shows a structure of an exemplary subframe sequence for a positioning reference signal (PRS).

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that is intended for positioning. Downlink (DL) or sidelink (SL) signals for which the primary purpose is unrelated to positioning, such as control or communication, are referred to herein as non-positioning reference signals (non-PRS). Examples of non-PRS include, but are not limited to, PHY channels, such as SSB, TRS, CSI-RS, PDSCH, DM-RS, PDCCH, PSSCH, and PSCCH. As discussed herein, the non-PRS signals, which are typically transmitted for purposes unrelated to positioning, may also be used by the UE for positioning purposes, e.g., in a hybrid positioning measurement. Similar to DL PRS transmitted by base stations, discussed above, a UE may transmit UL PRS for positioning, as well as UL or SL non-PRS that may be used for positioning. The UL PRS may be, e.g., sounding reference signals (SRS) for positioning, the UL non-PRS may be an SRS configured for MIMO communications, e.g. SRS for codebook-based UL, or non-codebook-based UL, or SRS for antenna switching or SRS for carrier switching.

Using received DL PRS or non-PRS from base stations or SL signaling from other UEs, and/or UL PRS or non-PRS transmitted to base stations or SL to other UEs, the UE may perform various positioning measurements, such as reference signal time difference (RSTD) measurements for time difference of arrival (TDOA) a positioning technique, reference signal received power (RSRP) measurements for TDOA, Angle of Departure, and Round Trip Time (RTT) or multi cell RTT (multi-RTT) positioning techniques, time difference between reception and transmission of signals (Rx-Tx) for a multi-RTT positioning technique, etc.

Various positioning technologies rely on DL, UL or SL PRS, which may also use the DL, UL, or SL non-PRS. For example, positioning technologies that use reference signal include downlink based positioning, uplink based positioning, and combined downlink and uplink based positioning. For example, downlink based positioning includes positioning methods such as DL-TDOA and DL-AoD. Uplink based positioning includes positioning method such as UL-TDOA and UL-AoA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

Figure 5:
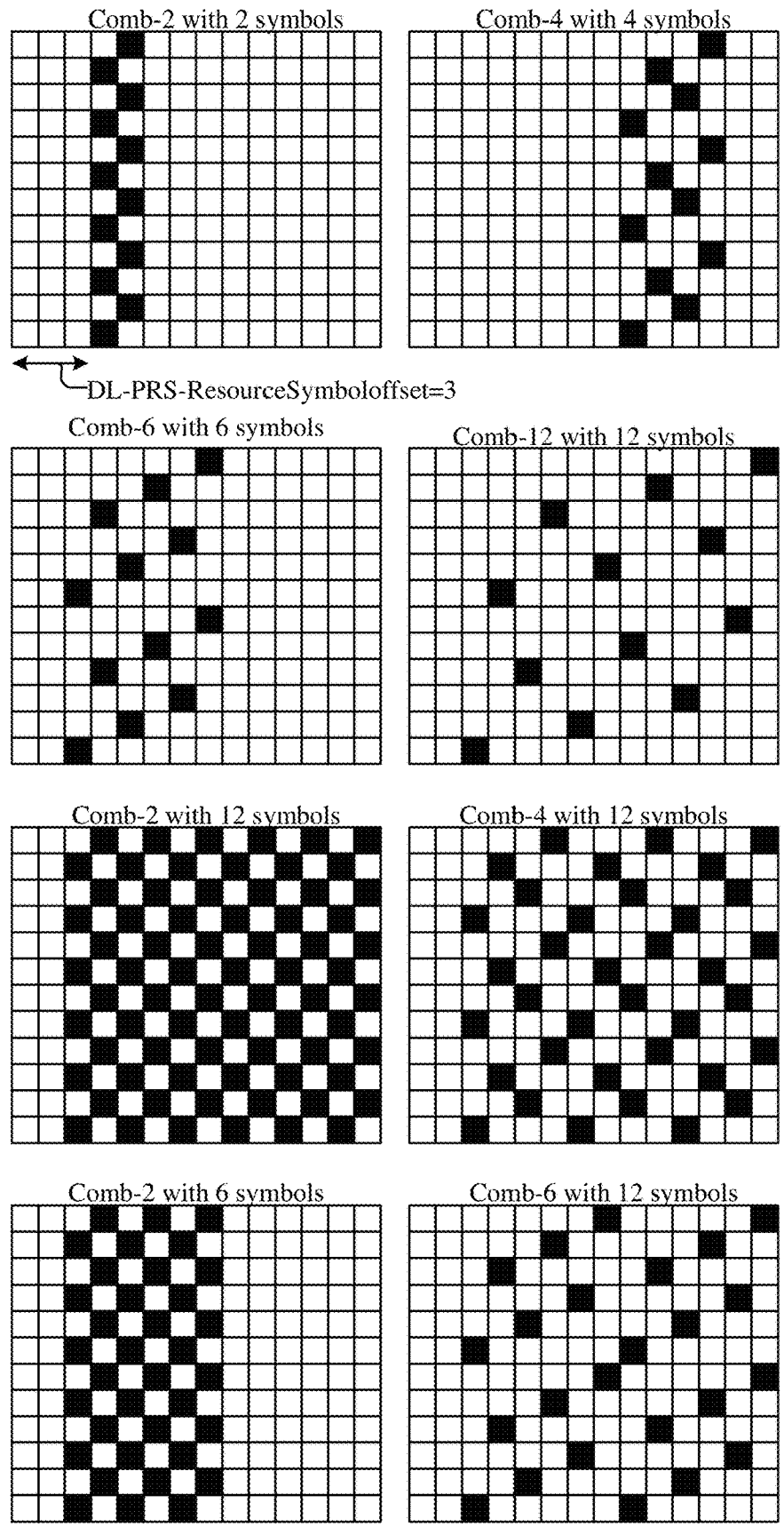
FIG. 5 illustrates various possible patterns for PRS resources.

FIG. 5 illustrates various possible patterns for DL PRS resources within a slot. For example, a DL PRS resource spans within a slot 2, 4, 6, or 12 consecutive symbols, with a fully frequency-domain staggered pattern, referred to as a "comb." The DL PRS resource may be configured in any high layer configured DL or frequency layer (FL) symbol of a slot, with a constant Energy Per Resource Element (EPRE) for all REs of a given DL PRS Resource. Table 2 illustrates various possible patterns of symbols and comb, which is shown visually in FIG. 5.

TABLE 2

|  | 2 symbols | 4 symbols | 6 symbols | 12 symbols |
|---|---|---|---|---|
| Comb-2 | {0, 1} | {0, 1, 0, 1} | {0, 1, 0, 1, 0, 1} | {0, 1, 0, 1, 0, 1, 0, 1, 0, 1, 0, 1} |
| Comb-4 | NA | {0, 2, 1, 3} | NA | {0, 2, 1, 3, 0, 2, 1, 3, 0, 2, 1, 3} |
| Comb-6 | NA | NA | {0, 3, 1, 4, 2, 5} | {0, 3, 1, 4, 2, 5, 0, 3, 1, 4, 2, 5} |
| Comb-12 | NA | NA | NA | {0, 6, 3, 9, 1, 7, 4, 10, 2, 8, 5, 11} |

On type of non-PRS, i.e., signal transmitted for purposes unrelated to positioning by that may be used for positioning purposes, e.g., in a hybrid positioning measurement, is a Tracking Reference Signal (TRS). TRS enables fine time tracking and frequency tracking capability. TRS are wide-band and transmitted in regular bursts. For example, the parameters for burst structure include X: TRS burst length in terms of #slots, and Y: the TRS burst periodicity in terms of #slots. TRS is configured as a CSI-RS resource set. The common values among the Non-Zero-Power (NZP) CSI-RS resources in the CSI-RS resource set configured for TRS is up to Radio Layer 2 (RAN2) for reducing signaling overhead. TRS may support a single port. A UE 104 may be configured with multiple TRS for multi-TRP/multi-panel transmission. TRS has an equal RE spacing in frequency domain within a TRS bandwidth. TRS is UE-specifically managed.

Table 3 illustrates various parameters for TRS.

TABLE 3

| Parameter | Definition | Values to consider for further down-selection |
|---|---|---|
| X | Length of TRS burst in #slots | For sub-6: 2 slots<br>For above-6: 1 or 2 slots |
| Y | TRS burst periodicity in #slots | For sub-6 and above-6: 10, 20, 40, 80 ms |
| N | #OFDM symbols for TRS within a slot | For sub-6 and above-6: 2 symbols |
| B | TRS BW in #RBs | BWP*, ~50RBs<br>*: for periodicities of 20 ms and above,<br>for 10 ms periodicity: 50RBs. |
| $S_f$ | TRS subcarrier spacing | 4 |
| $S_t$ | TRS symbol spacing within slot | 4 |

The UE 104 is not expected to receive TRS outside the BWP. The TRS RB position is configured by the gNB 102.

Figure 6A:
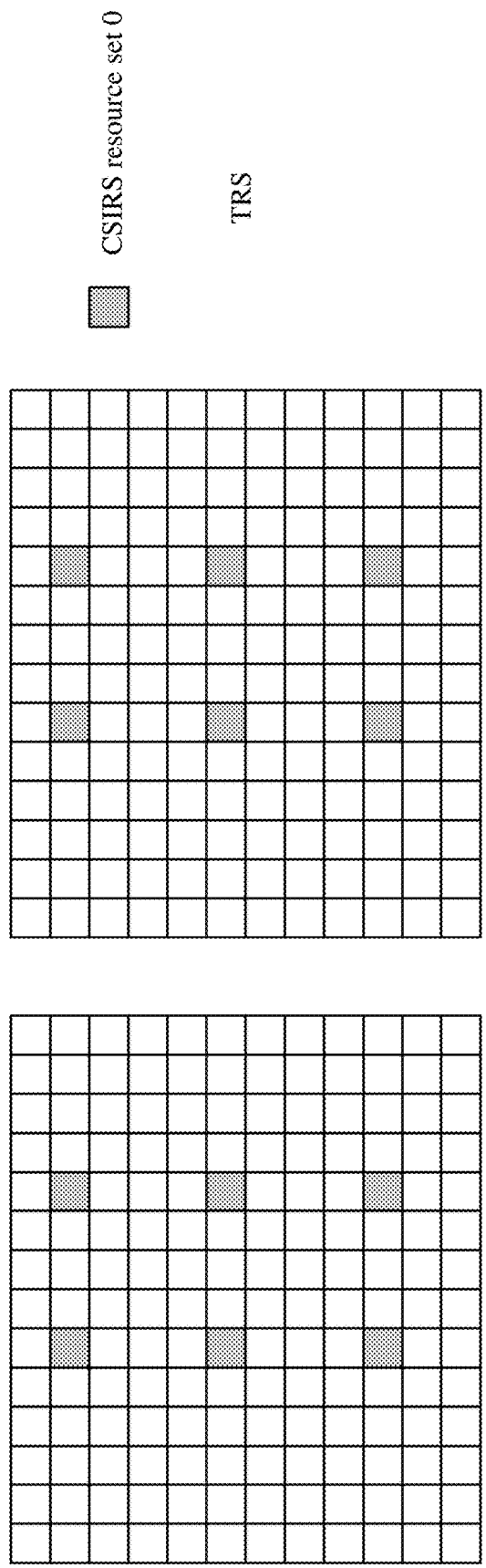
FIGS. 6A and 6B visually illustrate a Tracking Reference Signal (TRS) configuration and an extended TRS configuration, respectively.
Figure 6B:
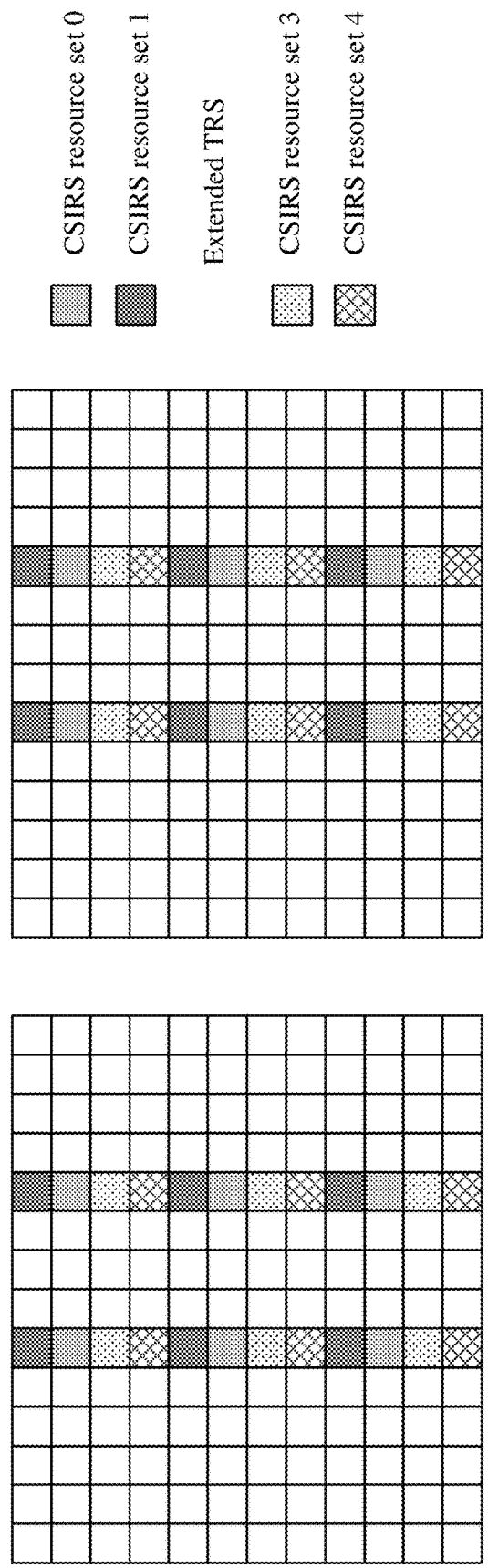

FIGS. 6A and 6B, by way of example, visually illustrates a TRS configuration and an extended TRS configuration, respectively, for two slots. In some implementations, TRS may be configured for one slot.

Figure 6C:
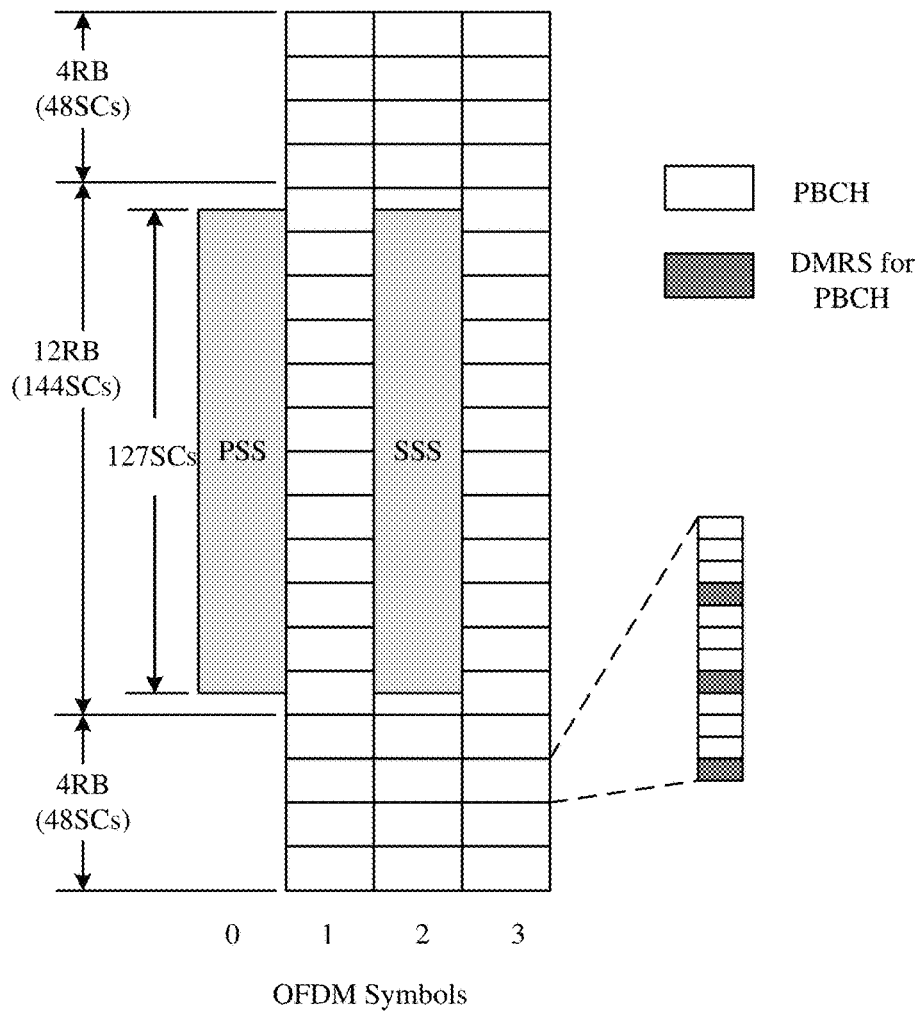
FIG. 6C visually illustrates a synchronization signal block (SSB) in a 5G NR wireless network.

FIG. 6C, by way of example, visually illustrates a synchronization signal block (SSB) in a 5G NR wireless network. The Synchronization Signal and Physical Broadcast Channel (PBCH) block (SSB/SS Block) may include a primary and a secondary synchronization signals (PSS, SSS), each occupying 1 symbol and 127 subcarriers, and PBCH spanning across 3 OFDM symbols and 240 subcarriers. The periodicity of the SSB can be configured by the network and the time locations where SSB can be sent are determined by sub-carrier spacing. Within the frequency span of a carrier, multiple SSBs can be transmitted. The Physical Cell Identifiers (PCIs) of the SSBs do not have to be unique, i.e. different SSBs can have different PCIs.

In some versions of the 3GPP specifications (e.g., 3 GPP "NR and NG-RAN Overall Description—Rel. 15," TS 38.300, 2018), the concept of SSB and burst emerged for periodic synchronization signal transmission from the gNBs. An SS block may be a group of 4 OFDM symbols in time and 240 subcarriers in frequency (i.e., 20 resource blocks), as shown in FIG. 6C. The SS block may carry the PSS, the SSS and the PBCH. A Demodulation Reference Signal (DMRS) associated with the PBCH may be used to estimate the Reference Signal Received Power (RSRP) of the SS block. In a slot of 14 symbols, there are two possible locations for SS blocks: symbols 2-5 and symbols 8-11. The SS blocks may be grouped into the first 5 ms of an SS burst, which can have different periodicities $T_{SS}$. For example, value of $T_{SS}$ may be on the order of 5, 10, 20, 40, 80, or 160 ms. When accessing the network for the first time, a UE may assume a periodicity $T_{SS}$=20 ms. When considering frequencies for which beam operations are required, each SS block may be mapped to a certain angular direction. To reduce the impact of SS transmissions, SS may be sent through wide beams, while data transmission for the active UE may usually performed through narrow beams, to increase the gain produced by beamforming.

Figure 6D:
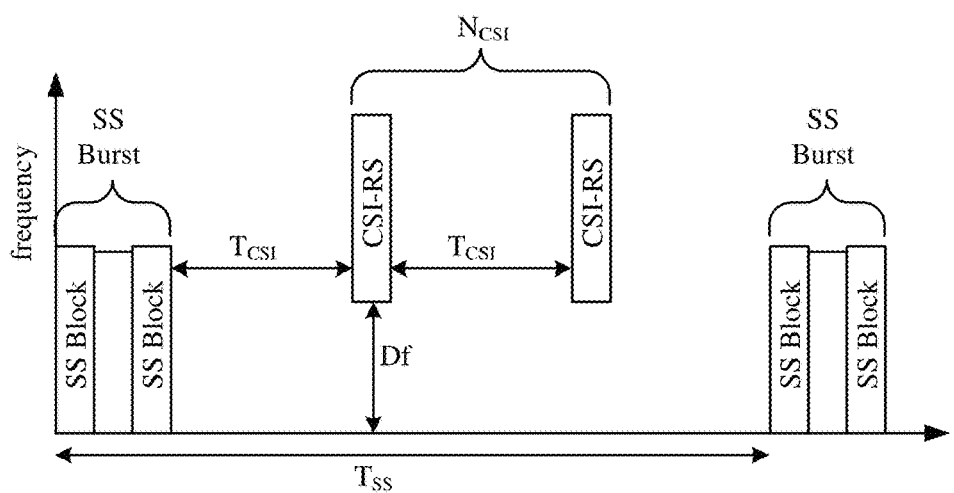
FIG. 6D shows an example Channel State Information Reference Signal (CSI-RS) configuration.

In an embodiment, CSI-RSs may be used for Radio Resource Management (RRM) measurements for mobility management purposes in connected mode. For example, it may be possible to configure multiple CSI-RS to the same SS burst, in such a way that a UE 104 may first obtain synchronization with a given cell using the SS bursts, and then use that as a reference to search for CSI-RS resources. The CSI-RS measurement window configuration may contain at least the periodicity and time/frequency offsets relative to the associated SS burst. FIG. 6D shows an example CSI-RS periodicity configuration in a 5G NR wireless network is shown. SS blocks may be sent every $T_{SS}$ ms, and they embed time and frequency offsets indicating the time and frequency allocation of CSI-RS signals within the frame structure. As depicted, a CSI-RS signal may be sent $T_{csi}$ ms after the end of an SS burst.

The DL and SL non-PRS may be used for performing positioning measurements by the UE 104. Currently, however, there is no mechanism to configure positioning assistance data for non-PRS to enable positioning measurements using non-PRS. Moreover, the UE currently has no mechanism to reporting positioning measurements that were performed based on non-PRS.

Positioning assistance data that a UE 104 receives from a location server 172, such as LMF 270, for NR Release 16 (r16), includes a database of available PRS resources, each of which is uniquely identified using, e.g., a PRS ID, a resource set ID, and a resource ID. There are, for example, 64 PRS IDs per frequency layer, and the PRS-ID is from 0-255 for up to 4 frequency layers. The TRP IDs span across all frequency layers and are not locally defined within each frequency layer. For example, a list of available TRPs may be provided to the UE in the positioning assistance data. The available TRPs are identified using a TRP ID. Within the parameters for each TRP, is information for PRS that is available. Table 4, below, for example, illustrates PRS information in a NR-DL-PRS-Info-r16 information element (IE), which provides a list of PRS resource sets, as specified in 3GPP TS 37.355. As illustrated, inside each PRS-ResourceSet is a ResourceSetID and how the PRS resource set is configured, e.g., number of symbols, time gap, repetition factor, power, the number of resources (e.g., DL-PRS-ResourceList-r16), etc.

TABLE 4

```
NR-DL-PRS-Info-r16 ::=SEQUENCE {
    nr-DL-PRS-ResourceSetList-r16          SEQUENCE (SIZE
    (1..nrMaxSetsPerTrp-r16)) OF NR-DL-PRS-ResourceSet-r16,
    ...
}
NR-DL-PRS-ResourceSet-r16 ::=SEQUENCE {
    nr-DL-PRS-ResourceSetID-r16            NR-DL-PRS-ResourceSetID-r16,
    dl-PRS-Periodicity-and-ResourceSetSlotOffset-r16
        NR-DL-PRS-Periodicity-and-ResourceSetSlotOffset-r16,
    dl-PRS-ResourceRepetitionFactor-r16    ENUMERATED {n2, n4, n6, n8,
        n16, n32, ... }                    OPTIONAL, -- Need OP
    dl-PRS-ResourceTimeGap-r16             ENUMERATED {s1, s2, s4, s8,
        s16, s32, ... }                    OPTIONAL, -- Cond Rep
    dl-PRS-NumSymbols-r16                  ENUMERATED {n2, n4, n6,
        n12, ... },
```

TABLE 4-continued

| | |
|---|---|
| dl-PRS-MutingOption1-r16 | DL-PRS-MutingOption1-r16 OPTIONAL, -- Need OP |
| dl-PRS-MutingOption2-r16 | DL-PRS-MutingOption2-r16 OPTIONAL, -- Need OP |
| dl-PRS-ResourcePower-r16 | INTEGER (−60..50), |
| dl-PRS-ResourceList-r16 (1..nrMaxResourcesPerSet-r16)) OF NR-DL-PRS-Resource-r16, | SEQUENCE (SIZE |
| . . . | |
| } | |

As illustrated in Table 5, below, the NR-DL-PRS ResourceSet-r16 IE provides various parameters for each resource set, including the number of symbols, time gap, muting options, etc.

TABLE 5

| | |
|---|---|
| NR-DL-PRS-ResourceSet-r16 ::=SEQUENCE { | |
| nr-DL-PRS-ResourceSetID-r16 | NR-DL-PRS-ResourceSetID-r16, |
| dl-PRS-Periodicity-and-ResourceSetSlotOffset-r16 | R-DL-PRS-Periodicity-and-ResourceSetSlotOffset-r16, |
| dl-PRS-ResourceRepetitionFactor-r16 n16, n32, . . . } | ENUMERATED {n2, n4, n6, n8, OPTIONAL, -- Need OP |
| dl-PRS-ResourceTimeGap-r16 s16, s32, . . . } | ENUMERATED {s1, s2, s4, s8, OPTIONAL, -- Cond Rep |
| dl-PRS-NumSymbols-r16 n12, . . . }, | ENUMERATED {n2, n4, n6, |
| dl-PRS-MutingOption1-r16 OPTIONAL, -- Need OP | DL-PRS-MutingOption1-r16 |
| dl-PRS-MutingOption2-r16 OPTIONAL, -- Need OP | DL-PRS-MutingOption2-r16 |
| dl-PRS-ResourcePower-r16 | INTEGER (−60..50), |
| dl-PRS-ResourceList-r16 (1..nrMaxResourcesPerSet-r16)) OF NR-DL-PRS-Resource-r16, | SEQUENCE (SIZE |
| . . . | |
| } | |

Additionally, as illustrated in the NR-DL-PRS-Resource-r16 IE shown in Table 6 below, for every resource (NR-DL-PRS-Resource-r16), there is a resourceID. For each resourceID, parameters are provided that are specific to that PRS resource, such as the comb size, slot offset, symbol offset, etc.

TABLE 6

| | |
|---|---|
| NR-DL-PRS-Resource-r16 ::=SEQUENCE { | |
| nr-DL-PRS-ResourceID-r16 | NR-DL-PRS-ResourceID-r16, |
| dl-PRS-SequenceID-r16 | INTEGER (0.. 4095), |
| dl-PRS-CombSizeN-and-ReOffset-r16 | CHOICE { |
| n2-r16 | INTEGER (0..1), |
| n4-r16 | INTEGER (0..3), |
| n6-r16 | INTEGER (0..5), |
| n12-r16 | INTEGER (0..11) |
| }, | |
| dl-PRS-ResourceSlotOffset-r16 (0..nrMaxResourceOffsetValue-1-r16), | INTEGER |
| dl-PRS-ResourceSymbolOffset-r16 | INTEGER (0..12), |
| dl-PRS-QCL-Info-r16    DL-PRS-QCL-Info-r16 | OPTIONAL, |
| . . . | |
| } | |

Thus, each PRS is identified by a unique ID. For example, each resource set is provided with a resource set ID, i.e., nr-DL-PRS-ResourceSetID-r16, shown in Table 4, and each resource in a resource set is identified with a resource ID, i.e., nr-DL-PRS-ResourceID-r16. Moreover, the TRP to which the resource set is associated is likewise identified with a physical cell ID and/or a cell global ID. As shown in the NR-DL-PRS-AssistanceDataPerTRP-r16 information element shown below in Table 7. Accordingly, each PRS is uniquely identified in a database listing provided in the positioning assistance data using a PRS ID, resource set ID, and resource ID, as well as physical cell ID and cell global ID, if needed.

TABLE 7

```
NR-DL-PRS-AssistanceDataPerTRP-r16 ::=SEQUENCE {
    dl-PRS-ID-r16                  INTEGER (0..255),
    nr-PhysCellID-r16              NR-PhysCellID-r16
                                   OPTIONAL, -- Need ON
    nr-CellGlobalID-r16            NCGI-r15
                                   OPTIONAL, -- Need ON
    nr-ARFCN-r16                   ARFCN-ValueNR-r15
                                   OPTIONAL, -- Cond NotSameAsRefServ
    nr-DL-PRS-SFN0-Offset-r16      NR-DL-PRS-SFN0-Offset-r16,
    nr-DL-PRS-expectedRSTD-r16     INTEGER (-3841..3841),
    nr-DL-PRS-expectedRSTD-uncertainty-r16
                                   INTEGER (-246..246),
    nr-DL-PRS-Info-r16             NR-DL-PRS-Info-r16,
    ...
}
```

Additionally, the positioning assistance data includes a selection of PRS to be used, which is based on the positioning method. For example, Table 8, below, illustrates an IE for TDOA, NR-DL-TDOA-ProvideAssistanceData, which is used by the location server to provide assistance data to enable UE assisted and UE-based NR DL-TDOA. It may also be used to provide NR DL-TDOA positioning specific error reason.

TABLE 8

```
-- ASN1START
NR-DL-TDOA-ProvideAssistanceData-r16 ::=SEQUENCE {
    nr-DL-PRS-AssistanceData-r16      NR-DL-PRS-AssistanceData-r16
                                      OPTIONAL, -- Need ON
    nr-SelectedDL-PRS-IndexList-r16   NR-SelectedDL-PRS-IndexList-r16
                                      OPTIONAL, -- Need ON
    nr-PositionCalculationAssistance-r16
                                   NR-PositionCalculationAssistance-r16
                                      OPTIONAL, -- Cond UEB
    nr-DL-TDOA-Error-r16              NR-DL-TDOA-Error-r16
                                      OPTIONAL, -- Need ON
    ...
}
```

Table 9, below, illustrates an IE for AoD, NR-DL-AoD-ProvideAssistanceData, which is used by the location server to provide assistance data to enable UE assisted and UE-based NR DL-AoD. It may also be used to provide NR DL-AoD positioning specific error reason.

TABLE 9

```
-- ASN1 START
NR-DL-AoD-ProvideAssistanceData-r16 ::=SEQUENCE {
    nr-DL-PRS-AssistanceData-r16      NR-DL-PRS-AssistanceData-r16
                                      OPTIONAL, -- Need ON
    nr-SelectedDL-PRS-IndexList-r16   NR-SelectedDL-PRS-IndexList-r16
                                      OPTIONAL, -- Need ON
    nr-PositionCalculationAssistance-r16
                                   NR-PositionCalculationAssistance-r16
```

TABLE 9-continued

```
    nr-DL-AoD-Error-r16               NR-DL-AoD-Error-r16
                                      OPTIONAL, -- Cond UEB
                                      OPTIONAL, -- Need ON
    ...
}
-- ASN1STOP
```

Table 10, below, illustrates an IE for RTT, NR-Multi-RTT-ProvideAssistanceData, which is used by the location server to provide assistance data to enable UE assisted NR Multi-RTT. It may also be used to provide NR Multi-RTT positioning specific error reason.

TABLE 10

```
-- ASN1START
NR-Multi-RTT-ProvideAssistanceData-r16 ::=SEQUENCE {
    nr-DL-PRS-AssistanceData-r16      NR-DL-PRS-AssistanceData-r16
                                      OPTIONAL, -- Need ON
    nr-SelectedDL-PRS-IndexList-r16   NR-SelectedDL-PRS-IndexList-r16
                                      OPTIONAL, -- Need ON
    nr-Multi-RTT-Error-r16            NR-Multi-RTT-Error-r16
                                      OPTIONAL, -- Need ON
    ...
}
-- ASN1STOP
```

The selected PRS is identified using the PRS ID. Table 11 below, for example, illustrates the NR-SelectedDL-PRS-IndexList IE that is used by the location server to identify selected PRS, e.g., based on frequency layer index, TRP index, resource set index, and resource index.

TABLE 11

```
NR-SelectedDL-PRS-IndexList-r16 ::=   SEQUENCE (SIZE
    (1..nrMaxFreqLayers-r16)) OF NR-SelectedDL-PRS-PerFreq-r16
NR-SelectedDL-PRS-PerFreq-r16 ::=SEQUENCE {
    nr-SelectedDL-PRS-FrequencyLayerIndex-r16   INTEGER
        (0..nrMaxFreqLayers-1-r16),
    nr-SelectedDL-PRS-IndexListPerFreq-r16      SEQUENCE (SIZE
        (1..nrMaxTRPsPerFreq-r16)) OF
            NR-SelectedDL-PRS-IndexPerTRP-r16
            OPTIONAL, --Need ON
    ...
}
NR-SelectedDL-PRS-IndexPerTRP-r16 ::=SEQUENCE {
    nr-SelectedTRP-Index-r16   INTEGER (0..nrMaxTRPsPerFreq-1-r16),
    dl-SelectedPRS-ResourceSetIndexList-r16     SEQUENCE (SIZE
        (1..nrMaxSetsPerTrp-r16)) OF
            DL-SelectedPRS-ResourceSetIndex-r16
            OPTIONAL, --Need ON
    ...
}
DL-SelectedPRS-ResourceSetIndex-r16 ::=SEQUENCE {
    nr-DL-SelectedPRS-ResourceSetIndex-r16      INTEGER
        (0..nrMaxSetsPerTrp-1-r16),
    dl-SelectedPRS-ResourceIndexList-r16        SEQUENCE (SIZE
        (1..nrMaxResourcesPerSet-r16)) OF
            DL-SelectedPRS-ResourceIndex-r16
            OPTIONAL --Need ON
}
DL-SelectedPRS-ResourceIndex-r16 ::=SEQUENCE {
    nr-dl-SelectedPRS-ResourceIdIndex-r16       INTEGER
        (0..nrMaxNumDL-PRS-ResourcesPerSet-1-r16),
    ...
}
```

Further, the positioning assistance data provided to the UE 104 may further include beam information for the PRS. Table 12 below illustrates the NR-DL-PRS-BeamInfo-r16 IE, that may be used to associate beam information per TRP with a PRS-ID, e.g., dl-PRS-ID-r16, as well as with an associated PRS ID, e.g., associated-dl-PRS-ID-r16. The associated-dl-PRS-ID includes an ID for another TRP that has the same beam information, which is for overhead reduction, e.g., if the beam information is the same for multiple TRPs. The associated-dl-PRS-ID field specifies the dl-PRS-ID of the associated TRP from which the beam information is adopted. The beam information from the associated TRP is considered to be in Global Coordinate System (GCS) if the lcs-gcs-translation-parameter field is not provided, and to be in Local Coordinate System (LCS) if the lcs-gcs-translation-parameter field is provided. If the field is omitted, the beam information is provided via the dl-prs-BeamInfoSet field.

TABLE 12

```
NR-DL-PRS-BeamInfo-r16 ::=SEQUENCE (SIZE (1..nrMaxFreqLayers-r16)) OF
                               NR-DL-PRS-BeamInfoPerFreqLayer-r16
NR-DL-PRS-BeamInfoPerFreqLayer-r16 ::=SEQUENCE (SIZE
      (1..nrMaxTRPsPerFreq-r16)) OF NR-DL-PRS-BeamInfoPerTRP-r16
NR-DL-PRS-BeamInfoPerTRP-r16 ::= SEQUENCE {
   dl-PRS-ID-r16                 INTEGER (0..255),
   nr-PhysCellID-r16             NR-PhysCellID-r16         OPTIONAL, -- Need ON
   nr-CellGlobalID-r16           NCGI-r15                  OPTIONAL, -- Need ON
   nr-ARFCN-r16                  ARFCN-ValueNR-r15
                                 OPTIONAL,                 -- Cond NotSameAsRefServ
   associated-dl-PRS-ID-r16      INTEGER (0..255)                    OPTIONAL,
   lcs-gcs-translation-parameter-r16    LCS-GCS-Translation-Parameter-r16
                                 OPTIONAL,                 -- Need OP
   dl-prs-BeamInfoSet-r16        DL-PRS-BeamInfoSet-r16              OPTIONAL,
   . . .
```

Table 13 below, illustrates the SSB configuration in LPP in NR release 16. The UE 104 receives an SSB configuration, in which the TRP is identified (e.g., nr-PhysCellID-r16) and the frequency band is identified (e.g., nr-ARFCN-r16), along with the associated parameters of the transmitted SSB. The SSB configuration, however, is not provided for the purposes of positioning. The SSB configuration is provided in order to provide an indication of which PRS will be punctured due to a collision with the SSB, if any. Additionally, as can be seen in Table 13, there is no PRS ID associated with the SSB, because the SSB is not intended for positioning.

TABLE 13

```
-- ASN1START
NR-SSB-Config-r16 ::=SEQUENCE {
   nr-PhysCellID-r16          NR-PhysCellID-r16,
   nr-ARFCN-r16               ARFCN-ValueNR-r15,
   ss-PBCH-BlockPower-r16     INTEGER (-60..50),
   halfFrameIndex-r16         INTEGER (0..1),
   ssb-periodicity-r16        ENUMERATED { ms5,
         ms10, ms20, ms40, ms80, ms160, . . . },
   ssb-PositionsInBurst-r16   CHOICE{
   shortBitmap-r16            BIT STRING (SIZE (4)),
   mediumBitmap-r16           BIT STRING (SIZE (8)),
   longBitmap-r16             BIT STRING (SIZE (64))
   }                          OPTIONAL, --Need OR
   ssb-SubcarrierSpacing-r16  ENUMERATED {kHz15,
         kHz30, kHz60, kHz120, kHz240, . . . },
   sfn-SSB-Offset-r16         INTEGER (0..15),
   . . .
}
-- ASN1STOP
```

The positioning assistance data received the UE 104 further configures the positioning frequency layer. A DL PRS Positioning Frequency Layer is defined as a collection of DL PRS Resource Sets all of which have common parameters configured by the DL-PRS-PositioningFrequencyLayer IE. The UE 104 is configured to assume that parameters for each DL PRS resource(s) are configured via higher layer parameters DL-PRS-PositioningFrequencyLayer, DL-PRS-ResourceSet and DL-PRS-Resource. A positioning frequency layer consists of one or more PRS resource sets and it is defined by the following parameters. The DL-PRS-SubcarrierSpacing defines the subcarrier spacing (SCS) for the DL PRS resource. All DL PRS Resources and DL PRS Resource sets in the same DL-PRS-PositioningFrequencyLayer have the same value of DL-PRS-SubcarrierSpacing. The supported values of DL-PRS-SubcarrierSpacing are given in Table 4.2-1 of 3GPP Technical Specification (TS) 38.211. The DL-PRS-CyclicPrefix defines the cyclic prefix (CP) for the DL PRS resource. All DL PRS Resources and DL PRS Resource sets in the same DL-PRS-PositioningFrequencyLayer have the same value of DL-PRS-CyclicPrefix. The supported values of DL-PRS-CyclicPrefix are given in Table 4.2-1 of 3GPP 38.211. The DL-PRS-PointA defines the absolute frequency of the reference resource block. Its lowest subcarrier is also known as Point A. All DL PRS resources belonging to the same DL PRS Resource Set have common Point A and all DL PRS Resources sets belonging to the same DL-PRS-PositioningFrequencyLayer have a common Point A. The DL-PRS-StartPRB defines the starting PRB index of the DL PRS resource with respect to reference Point A, where reference Point A is given by the higher-layer parameter DL-PRS-PointA. The starting PRB index has a granularity of one PRB with a minimum value of 0 and a maximum value of 2176 PRBs. All DL PRS Resource Sets belonging to the same Positioning Frequency Layer have the same value of Start PRB. The DL-PRS-ResourceBandwidth defines the number of resource blocks configured for PRS transmission. The parameter has a granularity of 4 PRBs with a minimum of 24 PRBs and a maximum of 272 PRBs. All DL PRS resources sets within a positioning frequency layer have the same value of DL-PRS-ResourceBandwidth. The DL-PRS-CombSizeN defines the comb size of a DL PRS resource where the allowable values are given in Clause 7.4.1.7.1 of 3GPP TS 38.211. All DL PRS resource sets belonging to the same positioning frequency layer have the same value of DL-PRS-combSizeN.

After performing requested positioning measurements, the UE 104 reports the measurement information to another entity, e.g., the location server 172, and identifies the PRS that was used in the positioning measurement using the PRS ID. The UE 104 reports the measurement information in an information element that is associated with the particular measurement. For example, Table 14 below illustrates an information element for a TDOA measurement, NR-DL-TDOA-SignalMeasurementInformation, which may be used by the UE 104 to provide NR DL-TDOA measurements to the location server 172. As illustrated in Table 14, the NR-DL-TDOA-SignalMeasurementInformation IE provides an identifier for the PRS used for the measurement (i.e., dl-PRS-ID-r16), which includes physical cell ID (i.e., nr-PhysCellID-r16, the resource ID (i.e., nr-DL-PRS-ResourceID-r16), and the resource set ID (i.e., nr-DL-ResourceSetID-r16). The resource ID is a local index within a set of a PRS ID; the resource set ID is a local index of a set within a PRS ID, and physical cell ID is the Physical Cell (PCI) of the TRP associated with the PRS ID. In addition, the UE 104 provides a time stamp indicating when the measurement occurred, as well as the granularity for the measurements, as the nr-RSTD-r16, which may be selected from granularities k0-k5.

TABLE 14

```
NR-DL-TDOA-SignalMeasurementInformation-r16 ::=SEQUENCE {
    dl-PRS-ReferenceInfo-r16        DL-PRS-ID-Info-r16,
    nr-DL-TDOA-MeasList-r16         NR-DL-TDOA-MeasList-r16,
    ...
}
NR-DL-TDOA-MeasList-r16 ::= SEQUENCE (SIZE(1..nrMaxTRPs-r16)) OF
        NR-DL-TDOA-MeasElement-r16
NR-DL-TDOA-MeasElement-r16 ::=SEQUENCE {
    dl-PRS-ID-r16                   INTEGER (0..255),
    nr-PhysCellID-r16               NR-PhysCellID-r16            OPTIONAL,
    nr-CellGlobalID-r16             NCGI-r15                     OPTIONAL,
    nr-ARFCN-r16                    ARFCN-ValueNR-r15            OPTIONAL,
    nr-DL-PRS-ResourceID-r16        NR-DL-PRS-ResourceID-r16
        OPTIONAL,
    nr-DL-PRS-ResourceSetID-r16  NR-DL-PRS-ResourceSetID-r16
        OPTIONAL,
    nr-TimeStamp-r16                NR-TimeStamp-r16,
    nr-RSTD-r16                     CHOICE {
        k0-r16                          INTEGER (0..1970049),
        k1-r16                          INTEGER (0..985025),
        k2-r16                          INTEGER (0..492513),
        k3-r16                          INTEGER (0..246257),
        k4-r16                          INTEGER (0..123129),
        k5-r16                          INTEGER (0..61565),
        ...
    },
    nr-AdditionalPathList-r16       NR-AdditionalPathList-r16    OPTIONAL,
    nr-TimingQuality-r16            NR-TimingQuality-r16,
    nr-DL-PRS-RSRP-Result-r16       INTEGER (0..126)             OPTIONAL,
    nr-DL-TDOA-AdditionalMeasurements-r16
        NR-DL-TDOA-AdditionalMeasurements-r16
        OPTIONAL,
    ...
}
```

Similar to the report for TDOA, discussed above, the UE 104 provides reports of measurement information for other types of positioning measurements, where the PRS signals used in the positioning measurement are identified based on the PRS ID.

As can be seen from the above discussion, the positioning assistance data received by the UE 104 and the measurement information reported by the UE 104 rely on the use of the PRS ID to specifically identify the PRS for positioning measurements, e.g., either to identify the PRS that are be used for the positioning measurements, in the case of positioning assistance data, or to report the PRS that were used in the positioning measurements, in the case of a measurement report. Neither the positioning assistance data nor the measurement information reports are capable of identifying non-PRS, e.g., TRS, SSB, DMRS, etc., that may be used for positioning measurements by the UE 104.

In one implementation, the UE 104 is provided with an association between non-PRS signals, which may be downlink or sidelink, that may be used for positioning and the PRS-ID. For example, the UE 104 may receive positioning assistance data that associates non-PRS, such as SSB, TRS, CSI-RS, PDSCH, DMRS, PDCCH, PSSCH, PSCCH with the PRS-ID that is provided in the positioning assistance data.

In some implementations, the non-PRS may be associated with a unique PRS-ID. In other implementations, however, the PRS-ID may be shared with a PRS and a non-PRS. Where the PRS and non-PRS are associated with the same PRS-ID, however, the signals are transmitted by the same port, i.e., they are from Quasi-Colocation (QCL) antennas, but they need not be coherent. For example, in order to perform an accurate time of arrival measurement with either a PRS or non-PRS that share the same PRS-ID, the PRS and non-PRS signals should be QCL, but they may be non-coherent.

The positioning assistance data may select a particular PRS-ID to be used for a positioning measurement. The PRS-ID may be uniquely associated with non-PRS or may be shared by both a PRS and a non-PRS. The UE 104 may perform the requested positioning measurement using the PRS or the non-PRS associated with the selected PRS-ID. If the selected PRS-ID is associated with both a PRS and a non-PRS, the choice of which signal to use for the positioning measurement, i.e., the PRS, the non-PRS, or both the PRS and non-PRS, may be made by the UE 104, e.g., opportunistically or based on quality parameters. Alternatively, the network, e.g., the serving base station 102, may decide which signal that is associated with the PRS-ID is to be used for the positioning measurement by the UE 104, e.g., by turning off one of the signals (such as the PRS) based on quality or priority factors.

After the UE 104 performs the positioning measurements, the UE 104 may report the measurement information referring to the PRS-ID to identify the PRS signal or non-PRS signal used for the positioning measurement. If the same PRS-ID is associated with both a PRS and a non-PRS, the UE 104 may simply refer to the PRS-ID and need not further specify whether the signal used for the positioning measurement was the PRS or non-PRS. In other implementations, the UE 104 may provide an further indication of whether the signal used for the positioning measurement was the PRS or non-PRS. However, need for the UE 104 to provide the further indication of which signal was used for positioning measurements may be obviated by uniquely associating the non-PRS with a PRS-ID.

In one example, the configuration in which non-PRS is associated with PRS-ID may be provided to the UE 104 in positioning assistance data together with the conventional PRS resources by a location server 172, e.g., LMF 270, in an LPP message. For example, the association between any of the non-PRS and the PRS-ID may be provided in the positioning assistance data in the PRS-Resource IE, e.g., that is illustrated in Table 6, or in the beam information IE, e.g., that is illustrated in Table 12. Alternatively, the association between a non-PRS and the PRS-ID may be provided in the configuration information element for that respective non-PRS. For example, if an SSB may be used as a reference signal for positioning, then a PRS-ID may be associated with the SSB in the SSB-Information configuration information element, e.g., that is illustrated in Table 13. Similarly, if a TRS may be used as reference signal for positioning, when the TRS configuration is provided in an LPP message, a PRS-ID may be associated with the TRS in a TRS configuration information element. Similarly, if a CSI-RS, PSSCH, or DMRS may be used as a reference signal for positioning, a PRS-ID may be associated with the CSI-RS, PSSCH, or DMRS in a configuration information element. If a PDSCH (or DMRS) may be used as reference signal for positioning, a PRS-ID may be associated with it. Because PDSCH/DMRS is scheduled dynamically by the UE 104, however, the PRS-ID associated with the PDSCH or DMRS is provided in a PDSCH configuration information element that does not include a time or frequency allocation of the PDSCH. For example, the time and frequency allocation of the PDSCH may be selected by the serving gNB 102.

Figure 7:
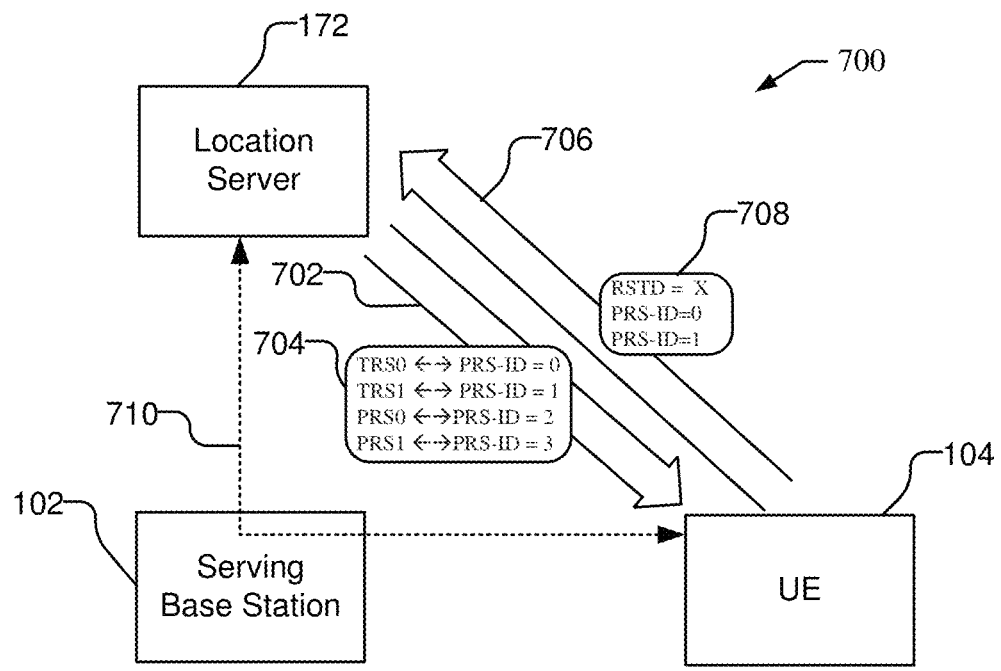
FIG. 7 illustrates a communication system in which the location server provides an association between non-PRS and PRS-ID in positioning assistance data to the UE.

FIG. 7, by way of example, illustrates a communication system 700 in which the location server 172 provides an association between non-PRS and PRS-ID in positioning assistance data to the UE 104. For example, as illustrated by arrow 702, the location server 172 provides positioning assistance data 704 to the UE 104. The positioning assistance data 704 includes configuration information for both PRS and non-PRS. For example, positioning assistance data 704 includes an association between non-PRS and PRS-IDs. For example, as illustrated TRS0 is associated with PRS-ID=0, TRS1 is associated with PRS-ID=1, and PRS0 is associated with PRS-ID=2, and PRS1 is associated with PRS-ID=3. It will be understood that, in fact, the location server 172 does not transmit messages directly to the UE 104, but that messages are transmitted through the serving base station 102, as illustrated by dotted arrow 710. The positioning assistance data 704 is contained in an LPP message that is sent from the location server 172 to the UE 104 via the serving base station 102. The serving base station 102 pass the LPP message to the UE 104 without decoding the message, and thus, in this implementation, the serving base station 102 is not aware of the association of the non-PRS with the PRS-IDs.

In another example, the configuration in which non-PRS is associated with PRS-ID may be provided to the UE 104 in positioning assistance data received from the serving base station 102, e.g., gNB, e.g., in a NRPPa message. The UE 104 may receive the remainder of the positioning assistance data from the location server 172, e.g., LMF 270. The serving base station 102 would additionally send the association of non-PRS with the PRS-IDs to the location server 172.

Figure 8:
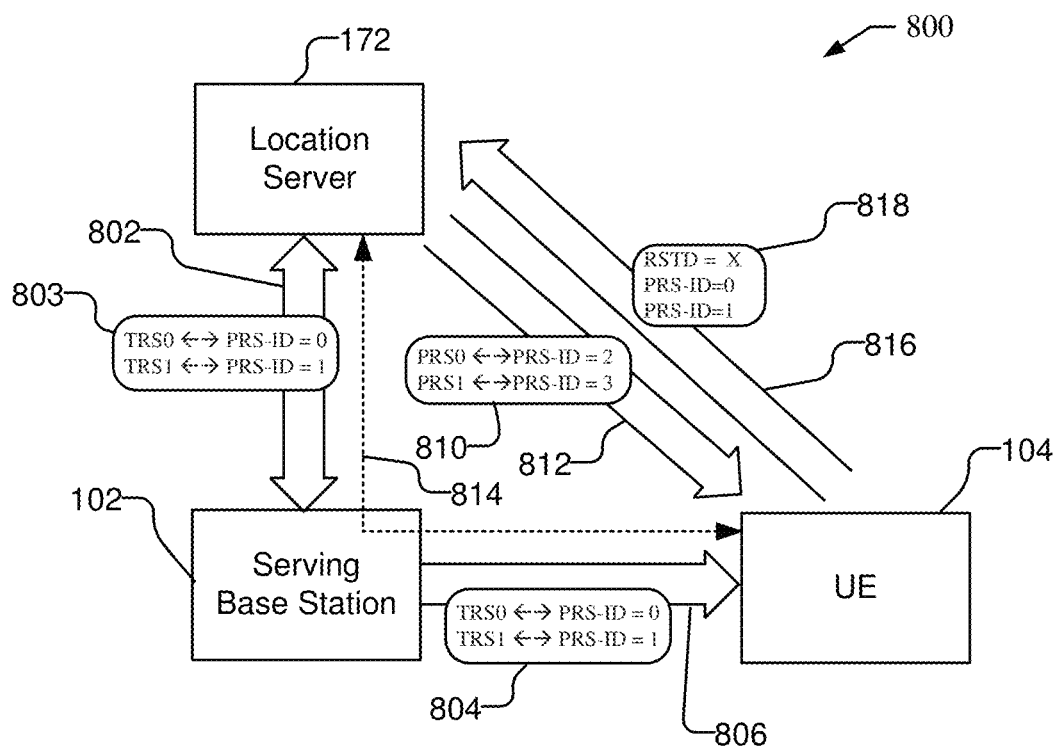
FIG. 8 illustrates a communication system in which the serving base station provides an association between non-PRS and PRS-ID in positioning assistance data to the UE.

FIG. 8, by way of example, illustrates a communication system 800 in which the serving base station 102 provides an association between non-PRS and PRS-ID in positioning assistance data to the UE 104 and the location server 172. For example, as illustrated by arrow 802, the location server 172 and the serving base station 102 communicate, e.g., the location server 172 requests an association of non-PRS signals with PRS-IDs. The location server 172, for example, may provide a listing of PRS and their PRS-IDs to the serving base station 102. The serving base station 102 in return may provide configuration parameter data 803 with the association of the non-PRS signals with PRS-IDs to the location server 172, e.g., in NRPPa messages. The configuration parameter data 803 may include non-PRS that are uniquely associated to PRS-IDs or that may share PRS-IDs with PRS, if the PRS and non-PRS are QCL. The serving base station 102 additionally sends the configuration parameters as positioning assistance data 804 to the UE 104 as illustrated by arrow 806, e.g., in an RCC message. In some implementations, the positioning assistance data 804 may include the assistance data received by the serving base station 102 from the location server 172 as well as the association of the non-PRS with the PRS-IDs. In other implementations, the positioning assistance data 804 may include the association of the non-PRS with the PRS-IDs, and the location server 172 may send the PRS related positioning assistance data 810 to the UE 104 via message 812, which may be an LPP message. For example, the positioning assistance data 804 from the serving base station 102 may include an association between non-PRS and PRS-IDs, as illustrated as TRS0 being associated with PRS-ID=0 and TRS1 being associated with PRS-ID=1. The positioning assistance data 810 from the location server may provide the association of the PRS with the PRS-ID, as illustrated as PRS0 being associated with PRS-ID=2 and PRS1 being associated with PRS-ID=3. As discussed in FIG. 7, the LPP message 812 is transmitted through the serving base station 102, as illustrated by dotted arrow 814, but the serving base station 102 does not decode the LPP message.

In the positioning assistance data, when non-PRS, such as SSBs, TRS, CSI-RS, PDSCH, DMRS, PDCCH, PSSCH, PSCCH, etc., are to be used for deriving positioning measurements, the non-PRS may be configured in separate resource sets or in separate frequency layers, than is used for the PRS. For example, the non-PRS may be configured within one or more dedicated resource set(s) that are separate from those that contain the configuration of the PRS. In another example, the non-PRS may be configured within one or more dedicated frequency layer(s) in the positioning assistance data that are separate frequency layers from those that contain the configuration of the PRS. Thus, for example, there may be a frequency layer that is configured for PRS, while a separate frequency layer that is configured for non-PRS that may be used for positioning. In some implementations, the UE 104 may perform positioning measurements, such as RSTD, using PRS from one frequency layer, and non-PRS from a separate frequency layer, e.g., in an inter-frequency RSTD. However, such as a configuration does not allow the configuration of a single frequency layer inside which some TRPs may transmit using PRS and other TRPs may transmit using non-PRS. Thus, the configuration requires multiple frequency layers, and some UEs may not support positioning measurement processing using multiple frequency layers.

In another configuration, an extended positioning frequency layers may be defined, for which it is possible to have non-PRS in the same frequency layer as PRS. The UE, for example, may need to report a positioning capability to support an extended positioning frequency layer. The extended positioning frequency layer may be constrained such that all reference signals, i.e., PRS and non-PRS, have the same center frequency and the numerology, e.g., subcarrier spacing (SCS), cyclic prefix (CP), but the bandwidth, the start PRB, reference signal pattern, e.g., comb size, may differ.

In another configuration, in addition to configuring the PRS and the non-PRS in separate resource sets, the non-PRS may be configured in different resource sets based on the type of non-PRS, e.g., separate resource sets may be used, each of which includes signals of the same PHY channel. For example, in addition to resource set for the PRS, there may be a resource set that includes the TRS, and a separate resource set that includes the SSBs, etc.

In another implementation, the positioning assistance data may define different accuracy and different measurement period requirements for positioning measurements, e.g., RSTD, Rx-Tx, RSRP, that are generated using different type of non-PRS signals.

The UE 104 may select a non-PRS resource for positioning measurements. For example, the current 3GPP TS 38.214 states "If the UE chooses to use a different reference time than indicated by the network, then it is expected to report the [ID], the DL PRS resource ID(s) or the DL PRS resource set ID used to determine the reference."

In one implementation, the UE 104 may be configured to report the PRS-ID associated with the non-PRS in the measurement information report. For example, the current 3GPP TS 38.214 states "For DL UE positioning measurement reporting in higher layer parameters DL-PRS-Rstd-MeasurementInfo or DL-PRS-UE-Rx-Tx-MeasurementInfo the UE can be configured to report the DL PRS resource ID(s) or the DL PRS resource set ID(s) associated with the DL PRS resource(s) or the DL PRS resource set(s) which are used in determining the UE measurements DL RSTD, UE Tx-Rx time difference or the DL PRS-RSRP." For example, as illustrated in FIG. 7 and FIG. 8, the UE 104 may report the measurement information to the location server 172, e.g., in an LPP message, in which the signals used to produce the positioning measurement are identified using the PRS-ID, which may be associated with a non-PRS signal. For example, as illustrated by arrows 706 and 816 in FIGS. 7 and 8, respectively, the UE 104 may provide a measurement information report 708 and 818, respectively, that identifies the results of a positioning measurement, e.g., RSTD=X, and identifies the PRS-IDs, e.g., PRS-ID=0 and PRS-ID=1, that are associated with the signals (e.g., TRS0 and TRS1) used to generate the RSTD positioning measurement.

For example, in the RSTD report from the UE 104, the signals that are being used to derive the RSTD measurement, may belong to the same Physical channel, i.e., are the same type. In other words, an RSTD measurement may be performed and reported using a reference and target signals that are both the same type of non-PRS. However, in the same report, the UE 104 may provide RSTD measurements that are derived using different type of signals. For example, a first RSTD measurement may be derived using PRS, while a second RSTD measurement may be derived using SSB, etc.

In a Rx-Tx measurement report, different Rx-Tx measurements reported by the UE 104 may be derived using different type of signals, e.g., signals from different Physical channels.

In one implementation, the UE 104 may be configured to provide its positioning capability indicating that the UE supports positioning measurements, e.g., deriving Rx-Tx, RSTD, RSRP, etc., using non-PRS signals. The UE 104 may specify the capability to support non-PRS for positioning per frequency band. For example, the UE 104 may indicate that the UE 104 supports positioning measurements using a different non-PRS per frequency band, and which type of non-PRS may be used in which frequency layer. The UE 104 may further indicate that it supports positioning measurements using a plurality of different non-PRS in a frequency layer. The UE 104 may further indicate whether the UE 104 is capable of simultaneous processing of different types of signals for the derivation of a single report. For example, the UE 104 may indicate whether the UE 104 supports reporting measurement information in a single report for positioning measurements generated using different types of non-PRS.

Figure 9:
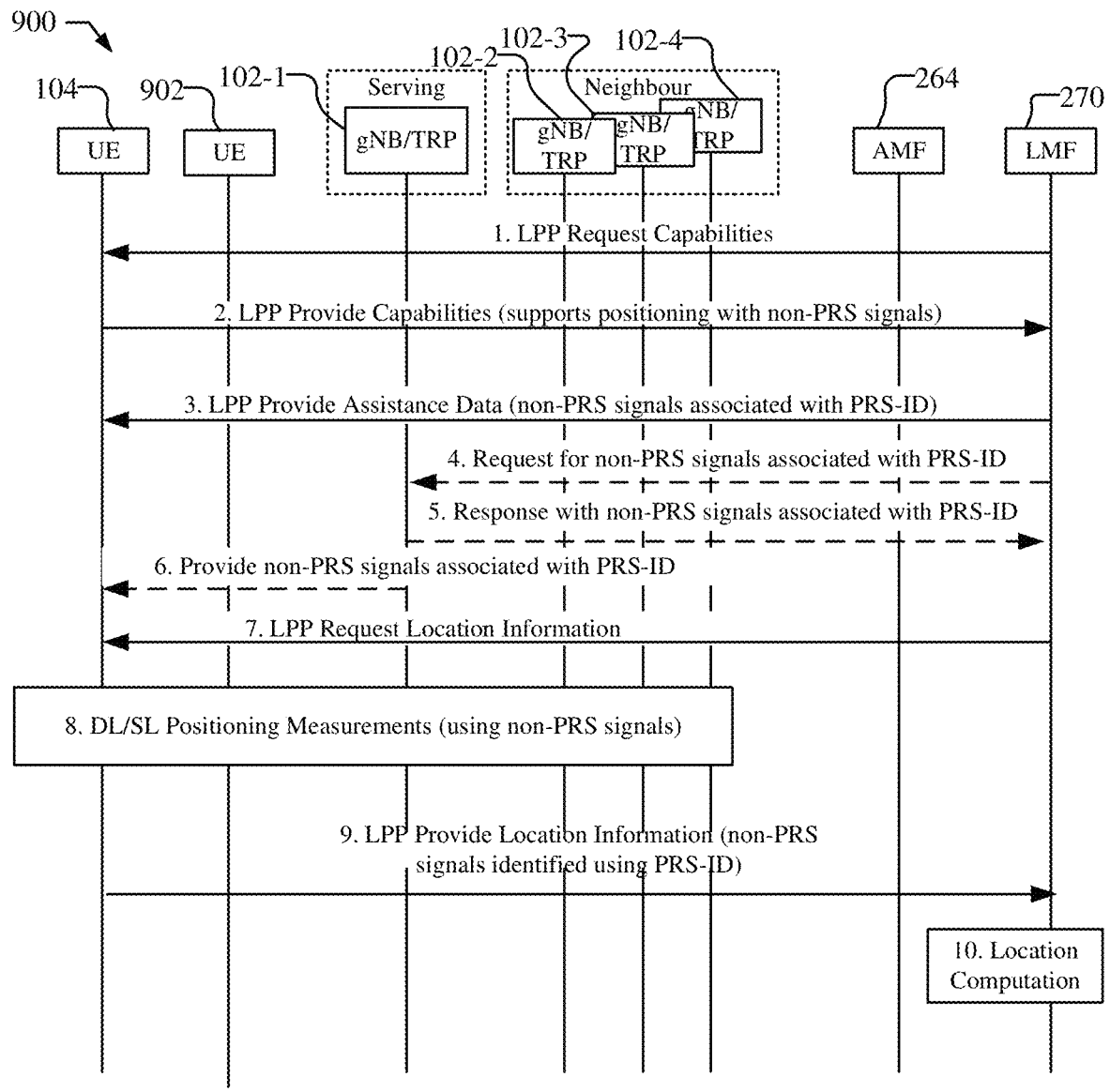
FIG. 9 is a message flow illustrating the messaging between entities in a communication system in which non-PRS signals may be used for positioning measurements.

FIG. 9 is a message flow 900 illustrating the messaging between the LMF 270, AMF 264, gNBs 102, and the UE 104 and second UE 902 for a UE assisted positioning procedure using DL or SL non-PRS signals. The serving gNB 102-1 and multiple neighboring gNBs 102-2, 102-3, and 102-4 may be sometimes collectively referred to as gNBs 102. The procedure illustrated in FIG. 9 may be used with DL or SL PRS and non-PRS signaling for e.g., RSTD, RSRP, Rx-Tx time difference measurements for TDOA, AoD, and Multi-RTT positioning techniques. It should be understood that for Multi-RTT positioning techniques, UL signaling from the UE 104 would also be transmitted and measured by the gNBs 102, which is not illustrated in FIG. 9.

At stage 1, the LMF 270 may request the positioning capabilities of the UE 104 using a LPP Capability Transfer procedure.

At stage 2, the UE 104 may send an LPP Provide Capabilities message, which may indicate that the UE 104 supports using non-PRS signals for positioning measurements. The UE 104, for example, may specify support for the use non-PRS to per frequency band, e.g., indicating the ability to use different non-PRS per frequency band and/or using a plurality of different non-PRS in a frequency layer. The UE 104 may further indicate whether the UE 104 is capable of simultaneous processing of different types of signals for the derivation of a single report. For example, the UE 104 may indicate whether the UE 104 supports reporting measurement information in a single report for positioning measurements generated using different types of non-PRS. The UE 104 may indicate capability to support extended positioning frequency layers for non-PRS.

At stage 3, the LMF 270 may prepare and send a LPP Provide Assistance Data message to the UE 104. In one implementation, e.g., consistent with FIG. 7, the assistance data may include a listing of PRS signals and non-PRS signals and may include an association of non-PRS signals with PRS-IDs. The LMF 270, for example, may obtain information related to PRS and non-PRS, e.g., from gNBs 102. The LMF 270 may prepare positioning assistance data accordingly, including a list of PRS-IDs and an association of the non-PRS with the PRS-IDs. The message sent to the UE 104 may include any required assistance data for the UE 104 to perform the necessary DL or SL positioning measurements. In one implementation, the non-PRS in the assistance data may be configured in separate resource sets or in separate frequency layers, than is used for the PRS. In one implementation, an extended positioning frequency layers to have non-PRS in the same frequency layer as PRS, e.g., constrained such that all reference signals, i.e., PRS and non-PRS, have the same center frequency and the numerology, e.g., subcarrier spacing (SCS), cyclic prefix (CP), but the bandwidth, the start PRB, reference signal pattern, e.g., comb size, may differ. The non-PRS may be configured in different resource sets based on the type of non-PRS, e.g., separate resource sets may be used, each of which includes signals of the same PHY channel Additionally, the assistance data may define different accuracy and different measurement period requirements for positioning measurements, e.g., RSTD, Rx-Tx, RSRP, that are generated using different type of non-PRS signals.

At optional stage 4, the LMF 270 may send to the serving gNB 102-1, a request for non-PRS signals associated with PRS-IDs, e.g., via an NRPPa message. The request, for example, may include a listing of PRS and PRS-IDs.

At optional stage 5, the serving gNB 102-1 may send to the LMF 270 a response with non-PRS signals associated with the PRS-IDs, e.g., via an NRPPa message.

At optional stage 6, the serving gNB 102-1 may send to the UE 104, assistance data that includes the association of the non-PRS signals with the PRS-IDs. In some implementations, the assistance data may include the listing of PRS and PRS-IDs received from the LMF 270 in stage 4, while in other implementations, the listing of PRS and PRS-IDs may be provided by the LMF 270 in assistance data provided in stage 3. Optional stages 4, 5, and 6, for example, are consistent with FIG. 8.

At stage 7, the LMF 270 sends a LPP Request Location Information message to the UE 104 to request DL or SL positioning measurements, such as RSTD, RSRP, Rx-Tx time difference measurements for TDOA, AoD, and Multi-RTT positioning techniques.

At stage 8, the UE 104 may perform downlink or sidelink positioning measurements using DL non-PRS signals transmitted by gNBs 102 or using SL non-PRS transmitted by UE 902. The UE 104 may additionally perform positioning measurements using PRS. In a UE based positioning processing, the UE 104 may further determine a position estimate using the positioning measurements.

At stage 9, the UE 104 reports the measurement information in a Provide Location Information message to a network node, e.g., consistent with FIGS. 7 and 8. The network node may be, e.g., the LMF 270, as illustrated in FIG. 9, or may be a serving base station 102-1 or UE 902, or another entity, such as a RAN based location server. The measurement information for example, identifies the non-PRS signals used to generate the positioning measurements using the PRS-ID associated with the non-PRS signals. For example, the measurement repot may be an RSTD report, which the signals used for each RSTD measurement may be the same type of non-PRS, but the report may include multiple RSTDs derived using different type of non-PRS (or PRS) signals. For a Rx-Tx measurement report, the measurement information may provide different Rx-Tx measurements derived using different type of non-PRS signals. In one implementation, e.g., in a UE based positioning procedure, the UE 104 may additionally provide a position estimate generated at stage 8.

At stage 10, the network node, illustrated as LMF 270 in FIG. 9, determines the position estimate for the UE 104, or verifies the position estimate if provided, using the positioning measurements reported in stage 9, and corresponding positioning techniques.

Figure 10:
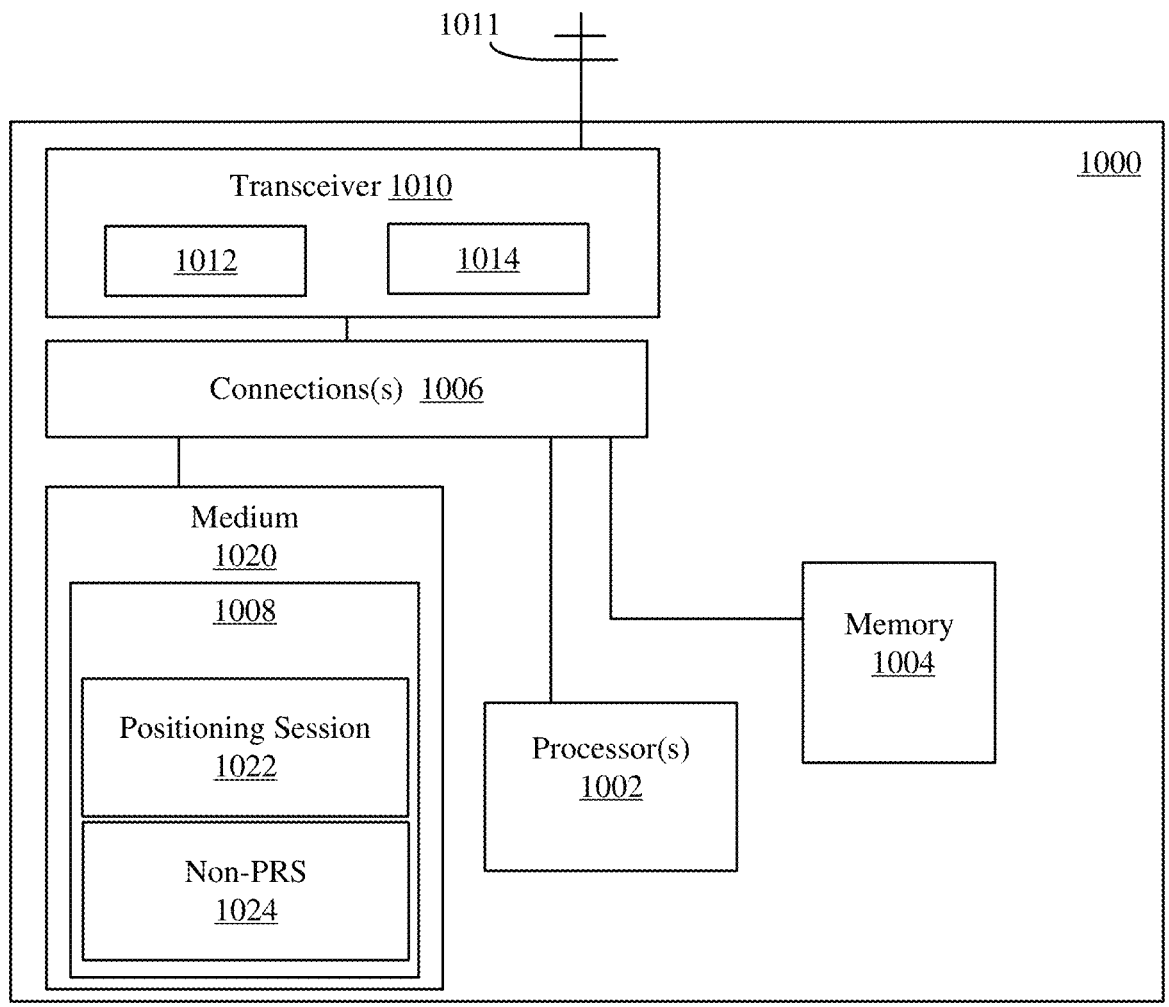
FIG. 10 shows a schematic block diagram illustrating certain exemplary features of a UE enabled to support positioning of the UE using non-PRS signals for positioning measurements.

FIG. 10 shows a schematic block diagram illustrating certain exemplary features of a UE 1000, e.g., which may be UE 104 shown in FIG. 1, enabled to support positioning of the UE using non-PRS signals for positioning measurements, as described herein. The UE 1000 is configured to perform the signal flow 900 shown in FIG. 9, the process flow 1300 shown in FIG. 13, and associated algorithms as discussed herein. UE 1000 may, for example, include one or more processors 1002, memory 1004, an external interface such as a transceiver 1010 (e.g., wireless network interface), which may be operatively coupled with one or more connections 1006 (e.g., buses, lines, fibers, links, etc.) to non-transitory computer readable medium 1020 and memory 1004. The UE 1000 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1000 may take the form of a chipset, and/or the like. Transceiver 1010 may, for example, include a transmitter 1012 enabled to transmit one or more signals over one or more types of wireless communication networks and a receiver 1014 to receive one or more signals transmitted over the one or more types of wireless communication networks.

In some embodiments, UE 1000 may include antenna 1011, which may be internal or external. UE antenna 1011 may be used to transmit and/or receive signals processed by transceiver 1010. In some embodiments, UE antenna 1011 may be coupled to transceiver 1010. In some embodiments, measurements of signals received (transmitted) by UE 1000 may be performed at the point of connection of the UE antenna 1011 and transceiver 1010. For example, the measurement point of reference for received (transmitted) RF signal measurements may be an input (output) terminal of the receiver 1014 (transmitter 1012) and an output (input) terminal of the UE antenna 1011. In a UE 1000 with multiple UE antennas 1011 or antenna arrays, the antenna connector may be viewed as a virtual point representing the aggregate output (input) of multiple UE antennas. In some embodiments, UE 1000 may measure received signals including signal strength and TOA measurements and the raw measurements may be processed by the one or more processors 1002.

The one or more processors 1002 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of UE 1000.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in UE 1000, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors. A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in UE 1000 is merely exemplary, and as such the functionality of the modules and/or data structures may be combined, separated, and/or be structured in different ways depending upon the implementation of the UE 1000.

The medium 1020 and/or memory 1004 may include a positioning session module 1022 that when implemented by the one or more processors 1002 configures the one or more processors 1002 to engage in a positioning session for the UE. For example, the one or more processors 1002 may be configured to engage in a positioning session by providing positioning capabilities to a location server, via the transceiver 1010. The one or more processors 1002 may be configured to receive positioning assistance data from a location server and/or serving base station, via the transceiver 1010. The one or more processors 1002 may be configured to perform positioning measurements, e.g., using the transceiver 1010. The one or more processors 1002 may further be configured to provide a measurement information report, via the transceiver 1010, to a network node, such as location server, serving base station or a sidelink UE.

The medium 1020 and/or memory 1004 may include a non-PRS module 1024 that when implemented by the one or more processors 1002 configures the one or more processors 1002 to use non-PRS signals for positioning. For example, the one or more processors 1002 may be configured include in the positioning capabilities sent to a location server support for use of non-PRS signals for positioning. The one or more processors 1002 may be configured to receive positioning assistance data that includes information related to non-PRS signals and an association of PRS-IDs and non-PRS signals for performing positioning measurements. The one or more processors 1002 may be configured to perform the positioning measurements using DL or SL non-PRS signals, e.g., using the transceiver 1010. The one or more processors 1002 may further be configured to include in the measurement information report the positioning measurements, as well as the PRS-ID associated with non-PRS signals used to generate the positioning measurements.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program 1008. For example, the non-transitory computer readable medium including program code 1008 stored thereon may include program code 1008 to support positioning of the UE using non-PRS signals for positioning measurements in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include a transceiver 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable code 1008 stored thereon, which if executed by one or more processors 1002 may be operatively enabled to perform all or portions of the example operations as described herein. Computer readable medium 1020 may be a part of memory 1004.

Figure 11:
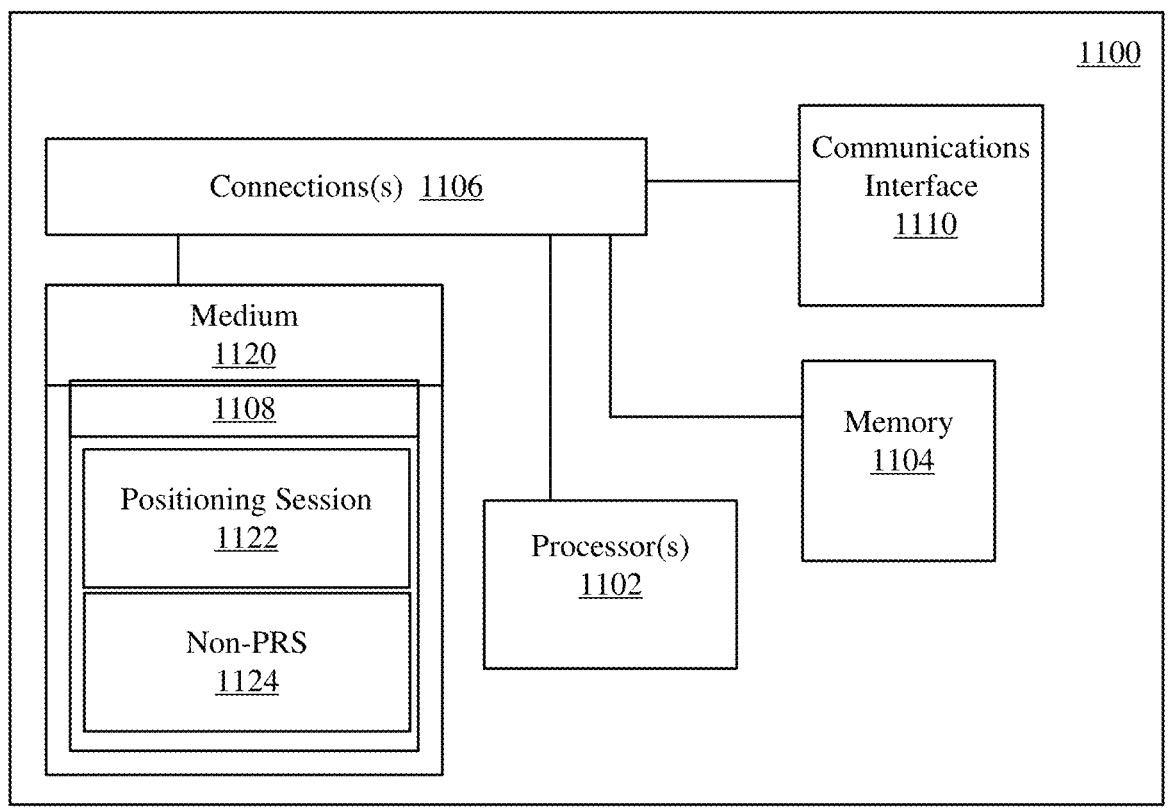
FIG. 11 shows a schematic block diagram illustrating certain exemplary features of a location server enabled to support positioning of the UE using non-PRS signals for positioning measurements.

FIG. 11 shows a schematic block diagram illustrating certain exemplary features of a location server 1100, e.g., location server 172, enabled to support positioning of the UE using non-PRS signals for positioning measurements, as described herein. The location server 1100 may be, e.g., a E-SMLC or LMF. The location server 1100 is configured to perform the signal flow 900 shown in FIG. 9, the process flow 1400 shown in FIG. 14, and associated algorithms as discussed herein. Location server 1100 may, for example, include one or more processors 1102, memory 1104, and an external interface 1110 (e.g., wireline or wireless network interface to other network entities, such as core network entities and base stations), which may be operatively coupled with one or more connections 1106 (e.g., buses, lines, fibers, links, etc.) to non-transitory computer readable medium 1120 and memory 1104. The location server 1100 may further include additional items, which are not shown, such as a user interface that may include e.g., a display, a keypad or other input device, such as virtual keypad on the display, through which a user may interface with the location server. In certain example implementations, all or part of location server 1100 may take the form of a chipset, and/or the like. The external interface 1110 may be a wired or wireless interface capable of connecting to base stations in the RAN or network entities, such as an AMF or MME.

The one or more processors 1102 may be implemented using a combination of hardware, firmware, and software.

For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of location server 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in location server 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors. A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in location server 1100 is merely exemplary, and as such the functionality of the modules and/or data structures may be combined, separated, and/or be structured in different ways depending upon the implementation of the location server 1100.

The medium 1120 and/or memory 1104 may include a positioning session module 1122 that when implemented by the one or more processors 1102 configures the one or more processors 1102 to engage in a positioning session for the UE. For example, the one or more processors 1102 may be configured to engage in a positioning session by requesting and receive positioning capabilities from a UE, via the external interface 1110. The one or more processors 1102 may be configured to generate and send positioning assistance data to the UE and/or serving base station, via the external interface 1110. The one or more processors 1102 may further be configured to receive a measurement information report, via the external interface 1110, from the UE. The one or more processors 1102 may further be configured to determine a position location for the UE based on the positioning measurements received in the measurement information report.

The medium 1120 and/or memory 1104 may include a non-PRS module 1124 that when implemented by the one or more processors 1102 configures the one or more processors 1102 to enable the use of non-PRS signals for positioning measurements by the UE. For example, the one or more processors 1102 may be configured receive in the positioning capabilities from the UE support for use of non-PRS signals for positioning. The one or more processors 1102 may be configured to generate positioning assistance data that includes information related to non-PRS signals and an association of PRS-IDs and non-PRS signals for performing positioning measurements or to receive the association of PRS-IDs and non-PRS signals from a serving base station. The one or more processors 1102 may further be configured to receive in the measurement information report from the UE the positioning measurements, as well as the PRS-ID associated with non-PRS signals used to generate the positioning measurements.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning of the UE using non-PRS signals for positioning measurements in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include an external interface 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
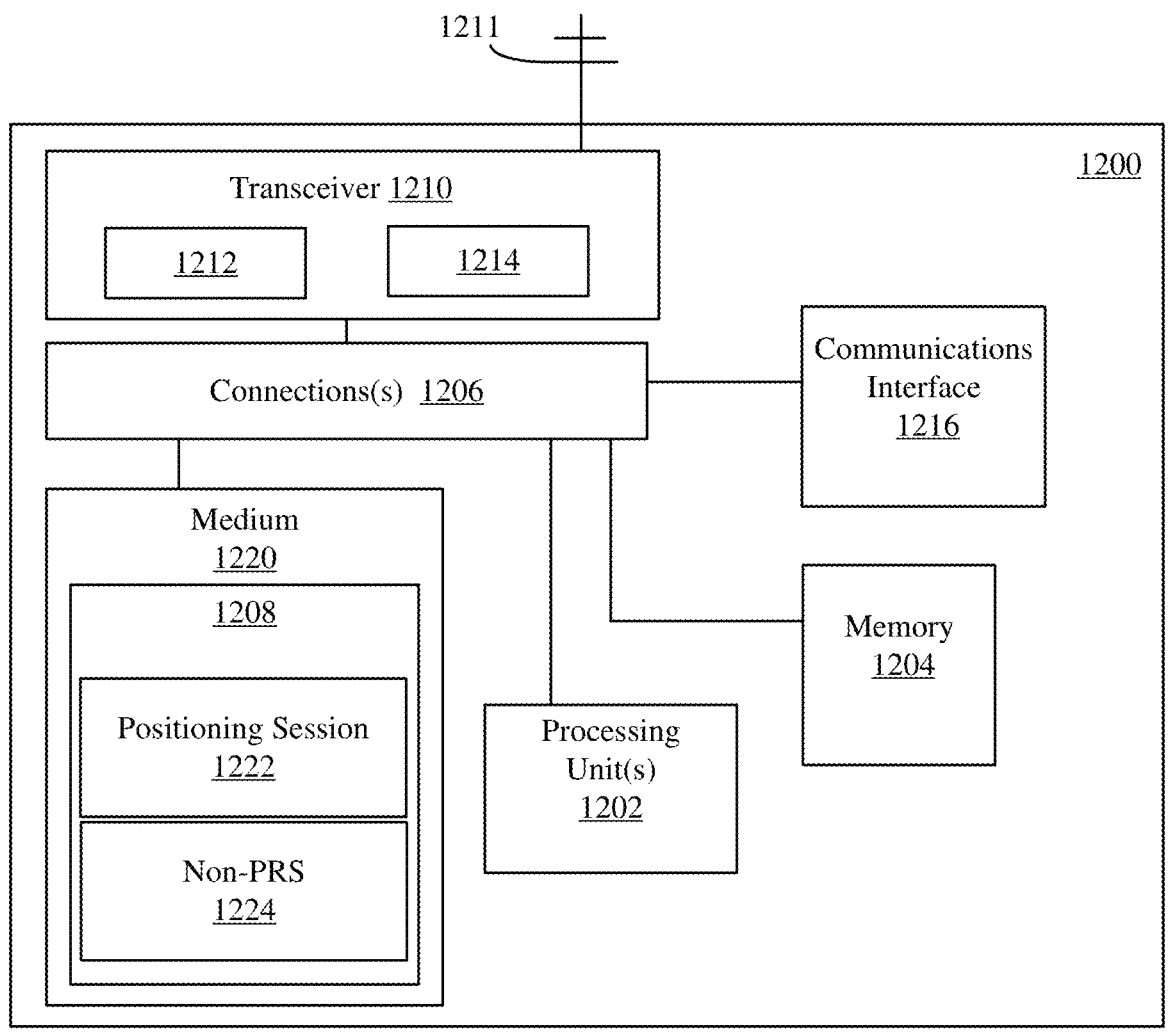
FIG. 12 shows a schematic block diagram illustrating certain exemplary features of a base station enabled to support positioning of the UE using non-PRS signals for positioning measurements.

FIG. 12 shows a schematic block diagram illustrating certain exemplary features of a base station 1200, e.g., base station 102 in FIG. 1, enabled to support positioning of the UE using non-PRS signals for positioning measurements, as described herein. The base station 1200 may be an eNB or gNB. The base station 1200 is configured to perform the signal flow 900 shown in FIG. 9, the process flow 1500 shown in FIG. 15, and associated algorithms as discussed herein. Base station 1200 may, for example, include one or more processors 1202, memory 1204, an external interface, which may include a transceiver 1210 (e.g., wireless network interface) and a communications interface 1216 (e.g., wireline or wireless network interface to other base stations and/or entities in the core network such as a location server), which may be operatively coupled with one or more connections 1206 (e.g., buses, lines, fibers, links, etc.) to non-transitory computer readable medium 1220 and memory 1204. The base station 1200 may further include additional items, which are not shown, such as a user interface that may include e.g., a display, a keypad or other input device, such as virtual keypad on the display, through which a user may interface with the base station. In certain example implementations, all or part of base station 1200 may take the form of a chipset, and/or the like. Transceiver 1210 may, for example, include a transmitter 1212 enabled to transmit one or more signals over one or more types of wireless communication networks and a receiver 1214 to receive one or more signals transmitted over the one or more types of wireless communication networks. The communications interface 1216 may be a wired or wireless interface capable of connecting to other base stations in the RAN or network entities, such as a location server 172 shown in FIG. 1.

In some embodiments, base station 1200 may include antenna 1211, which may be internal or external. Antenna 1211 may be used to transmit and/or receive signals processed by transceiver 1210. In some embodiments, antenna 1211 may be coupled to transceiver 1210. In some embodiments, measurements of signals received (transmitted) by base station 1200 may be performed at the point of connection of the antenna 1211 and transceiver 1210. For example, the measurement point of reference for received (transmitted) RF signal measurements may be an input (output) terminal of the receiver 1214 (transmitter 1212) and an output (input) terminal of the antenna 1211. In a base station 1200 with multiple antennas 1211 or antenna arrays, the antenna connector may be viewed as a virtual point representing the aggregate output (input) of multiple antennas. In some embodiments, base station 1200 may measure received signals including signal strength and TOA measurements and the raw measurements may be processed by the one or more processors 1202.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of base station 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in base station 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors. A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in base station 1200 is merely exemplary, and as such the functionality of the modules and/or data structures may be combined, separated, and/or be structured in different ways depending upon the implementation of the base station 1200.

The medium 1220 and/or memory 1204 may include a positioning session module 1222 that when implemented by the one or more processors 1202 configures the one or more processors 1202 to engage in a positioning session for the UE. For example, the one or more processors 1202 may be configured transmit and receive LLP messages for the UE 104 and location server 172 to engage in a positioning session. The one or more processors 1202 may be configured to transmit PRS and non-PRS signals, that may be used for positioning in the positioning session, e.g., via the transceiver 1210.

The medium 1220 and/or memory 1204 may include a non-PRS module 1224 that when implemented by the one or more processors 1202 configures the one or more processors 1202 to enable the use of non-PRS signals for positioning measurements by the UE. For example, the one or more processors 1202 may be configured receive PRS information from the location server and to generate an association of non-PRS signals with PRS-IDs and provide the associations to the location server.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support positioning of the UE using non-PRS signals for positioning measurements in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a transceiver 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

Figure 13:
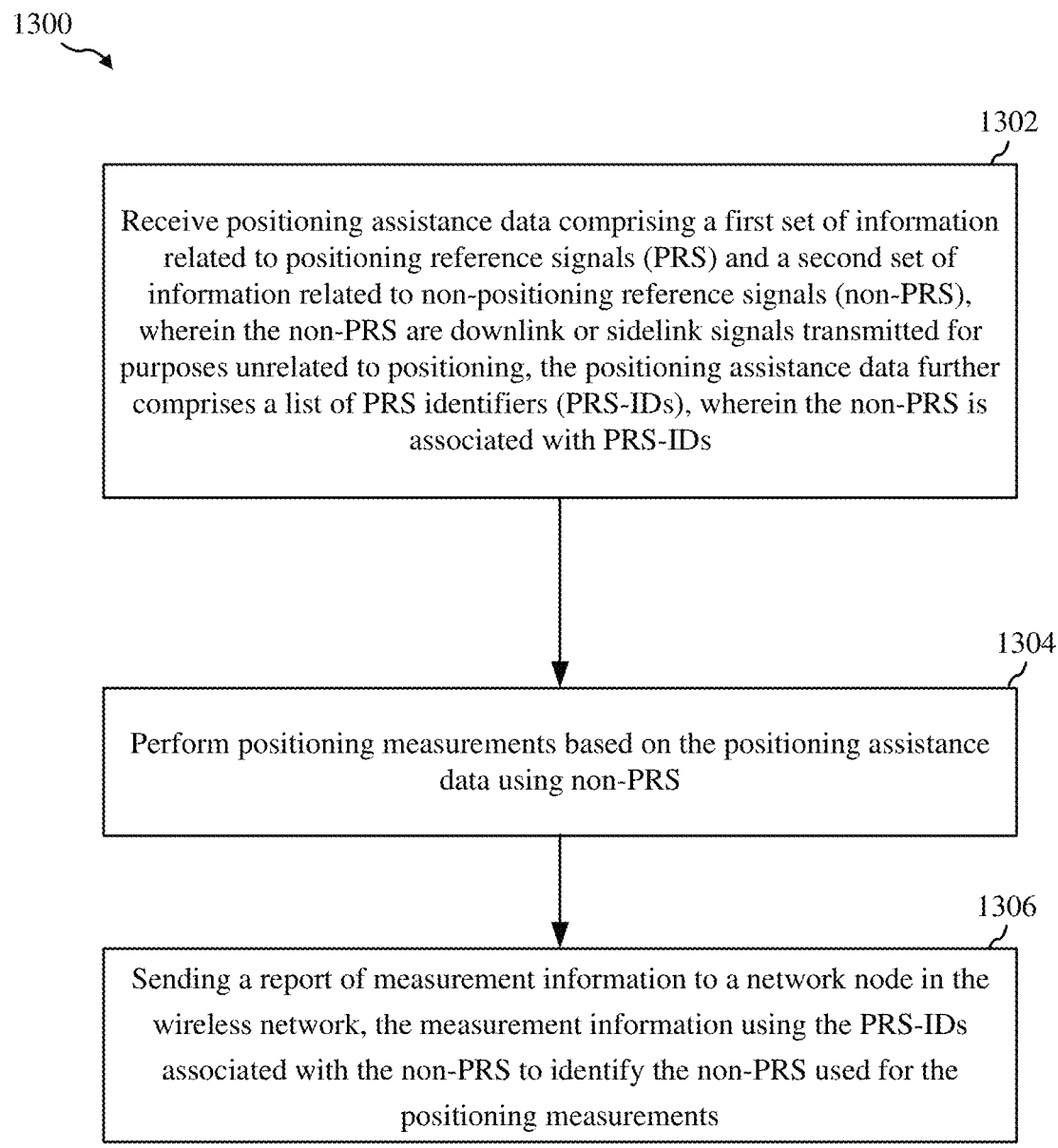
FIG. 13 shows a flowchart for an exemplary method for supporting positioning of a UE in a wireless network performed by the UE.

FIG. 13 shows a flowchart for an exemplary method 1300 for supporting positioning of a user equipment (UE) in a wireless network performed by the UE, such as UE 104, in a manner consistent with disclosed implementation.

At block 1302, the UE receives positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs, e.g., as discussed at stage 3 or stage 6 of FIG. 9. The non-PRS for example, may comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof. For example, the positioning assistance data may defines different accuracy and different period requirements for positioning measurements generated using different types of non-PRS. A means for receiving positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs may include the wireless transceiver 1010 and one or more processors 1002 with dedicated hardware or implementing executable code or software instructions in memory 1004 and/or medium 1020, such as the positioning session module 1022 and the non-PRS module 1024, in UE 1000 shown in FIG. 10.

At block 1304, the UE may perform performing positioning measurements based on the positioning assistance data using non-PRS, e.g., as discussed at stage 8, of FIG. 9. In one implementation, the positioning measurements may include a first Reference Signal Time Difference (RSTD) measurement, and wherein the non-PRS used for the first RSTD measurement are a first type of non-PRS. For example, the positioning measurements may include a second RSTD measurement, and the non-PRS used for the second RSTD measurement may be a second type of non-PRS that is different than the first type of non-PRS. In one implementation, the positioning measurements may be a plurality of receive time minus transmission time (Rx-Tx) measurements, and different types of non-PRS may be used for the Rx-Tx measurements.

A means for performing positioning measurements based on the positioning assistance data using non-PRS may include the wireless transceiver 1010 and one or more processors 1002 with dedicated hardware or implementing executable code or software instructions in memory 1004 and/or medium 1020, such as the positioning session module 1022 and the non-PRS module 1024, in UE 1000 shown in FIG. 10.

At block 1306, the UE may send a report of measurement information to a network node in the wireless network, the measurement information using the PRS-IDs associated with the non-PRS to identify the non-PRS used for the positioning measurements, e.g., as discussed at stage 9 of FIG. 9. A means for sending a report of measurement information to a network node in the wireless network, the measurement information using the PRS-IDs associated with the non-PRS to identify the non-PRS used for the positioning measurements may include the wireless transceiver 1010 and one or more processors 1002 with dedicated hardware or implementing executable code or software instructions in memory 1004 and/or medium 1020, such as the positioning session module 1022 and the non-PRS module 1024, in UE 1000 shown in FIG. 10.

In one implementation, the positioning assistance data may be received from the location server, e.g., as discussed at stage 3 of FIG. 9 and in FIG. 7. The non-PRS, for example, may include a Synchronization Signal Block (SSB), and the PRS-ID associated with the SSB may be provided in an SSB configuration information element. The non-PRS may include a Tracking Reference Signal (TRS), and the PRS-ID associated with the TRS may be provided in a TRS configuration information element. The non-PRS may include a Channel State Information Reference Signal (CSI-RS), and the PRS-ID associated with the CSI-RS may be provided in a CSI-RS configuration information element. The non-PRS may include a Demodulation Reference Signal (DMRS), and the PRS-ID associated with the DMRS may be provided in a DMRS configuration information element. The non-PRS may include a Physical Downlink Control Channel (PDCSH), and the PRS-ID associated with the PDCSH may be provided in a PDCSH configuration information element. In one implementation, the non-PRS may include a Physical Downlink Shared Channel (PDSCH), and the PRS-ID associated with the PDSCH may be provided in a PDSCH configuration information element which does not include time or frequency allocation of the PDSCH. For example, the time or frequency allocation of the PDSCH may be selected by a serving base station In one implementation, the association of the non-PRS with PRS-IDs in the positioning assistance data may be received from a serving base station.

In implementations, the non-PRS may be configured within one or more dedicated resource sets in the positioning assistance data which are separate from the resource sets that contain the configuration of PRS. The non-PRS may be configured within one or more dedicated frequency layers in the positioning assistance data which are separate from the frequency layers that contain the configuration of PRS. The second set of information related to the non-PRS in the positioning assistance data may be configured within a same frequency layer as the first set of information related to the PRS. For example, the non-PRS and the PRS may have a same center frequency and numerology but differ in at least one of bandwidth, starting Physical Resource Block (start-PRB), and comb, or a combination thereof. The second set of information related to the non-PRS may be sets of signals, each set of signals comprising non-PRS that belong to a same Physical channel In one implementation, the UE may provide a capability report to the network entity, the capability report indicates that the UE is capable of performing positioning measurements using non-PRS, e.g., as discussed at stage 2 of FIG. 9. A means for providing a capability report to the network entity, the capability report indicates that the UE is capable of performing positioning measurements using non-PRS may include the wireless transceiver 1010 and one or more processors 1002 with dedicated hardware or implementing executable code or software instructions in memory 1004 and/or medium 1020, such as the positioning session module 1022 and the non-PRS module 1024, in UE 1000 shown in FIG. 10. For example, the capability report may indicate frequency layers that the UE supports performing positioning measurements using different non-PRS. For example, the capability report may indicate that the UE supports performing positioning measurements using different non-PRS in a frequency layer. For example, the capability report may indicate whether the UE supports reporting measurement information in a single report for positioning measurements generated using different types of non-PRS.

FIG. 14 shows a flowchart for an exemplary method 1400 for supporting positioning of a user equipment (UE) in a wireless network performed by a location server in the wireless network, such as location server 172, in a manner consistent with disclosed implementation.

At block 1402, the location server may obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink or sidelink positioning measurements using the non-PRS, e.g., as discussed at stage 3 or stage 5 of FIG. 9. The non-PRS, for example, may include at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof. A means for obtaining a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS may include, e.g., the external interface 1110 and one or more processors 1102 with dedicated hardware or implementing executable code or software instructions in memory 1104 and/or medium 1120, such as the positioning session module 1122 and the non-PRS module 1124, in location server 1100 shown in FIG. 11.

At block 1404, the location server may receive a report of measurement information from the UE, the measurement information using the PRS-IDs associated with the non-PRS to identify the non-PRS used for the positioning measurements performed by the UE, e.g., as discussed at stage 9 of FIG. 9. In one implementation, the positioning measurements may include a first Reference Signal Time Difference (RSTD) measurement, and wherein the non-PRS used for the first RSTD measurement are a first type of non-PRS. For example, the positioning measurements may include a second RSTD measurement, and wherein the non-PRS used for the second RSTD measurement are a second type of non-PRS, wherein the first type of non-PRS is different than the second type of non-PRS. In one implementation, the positioning measurements may include a plurality of receive time minus transmission time (Rx-Tx) measurements, and wherein different types of non-PRS are used for the Rx-Tx measurements. A means for receiving a report of measurement information from the UE, the measurement information using the PRS-IDs associated with the non-PRS to identify the non-PRS used for the positioning measurements performed by the UE may include, e.g., the external interface 1110 and one or more processors 1102 with dedicated hardware or implementing executable code or software instructions in memory 1104 and/or medium 1120, such as the positioning session module 1122 and the non-PRS module 1124, in location server 1100 shown in FIG. 11.

In one implementation, the list of PRS-IDs and the association of the non-PRS with the PRS-IDs is obtained as positioning assistance data generated by the location server, and the location server may send the positioning assistance data to the UE, e.g., as discussed at stage 3 of FIG. 9. In one implementation, the positioning assistance data defines different accuracy and different period requirements for positioning measurements generated using different types of non-PRS. In one implementation, the non-PRS may include a Synchronization Signal Block (SSB), and the PRS-ID associated with the SSB may be provided in an SSB configuration information element. In one implementation, the non-PRS may include a Tracking Reference Signal (TRS), and the PRS-ID associated with the TRS may be provided in a TRS configuration information element. In one implementation, the non-PRS may include a Channel State Information Reference Signal (CSI-RS), and the PRS-ID associated with the CSI-RS may be provided in a CSI-RS configuration information element. In one implementation, the non-PRS may include a Demodulation Reference Signal (DMRS), and the PRS-ID associated with the DMRS may be provided in a DMRS configuration information element. In one implementation, the non-PRS may include a Physical Downlink Control Channel (PDCSH), and the PRS-ID associated with the PDCSH may be provided in a PDCSH configuration information element. In one implementation, the non-PRS may include a Physical Downlink Shared Channel (PDSCH), and the PRS-ID associated with the PDSCH may be provided in a PDSCH configuration information element which does not include time or frequency allocation of the PDSCH. For example, the time or frequency allocation of the PDSCH may be selected by a serving base station A means for sending the positioning assistance data to the UE may include, e.g., the external interface 1110 and one or more processors 1102 with dedicated hardware or implementing executable code or software instructions in memory 1104 and/or medium 1120, such as the positioning session module 1122 and the non-PRS module 1124, in location server 1100 shown in FIG. 11.

In one implementation, the association of the non-PRS with the PRS-IDs is obtained from a serving base station for the UE, wherein the serving base station sends the association of the non-PRS with the PRS-IDs to the UE, e.g., as discussed at stages 5 and 6.

In implementations, the non-PRS may be configured within one or more dedicated resource sets in the positioning assistance data which are separate from the resource sets that contain the configuration of PRS. The non-PRS may be configured within one or more dedicated frequency layers in the positioning assistance data which are separate from the frequency layers that contain the configuration of PRS. The second set of information related to the non-PRS in the positioning assistance data within a same frequency layer as the first set of information related to the PRS. For example, the non-PRS and the PRS have a same center frequency and numerology but differ in at least one of bandwidth, starting Physical Resource Block (startPRB), and comb, or a combination thereof. The second set of information related to the non-PRS comprises sets of signals, each set of signals comprising non-PRS that belong to a same Physical channel.

In one implementation, the location server receives a capability report from the UE, the capability report indicates that the UE is capable of performing positioning measurements using non-PRS, e.g., as discussed at stage 2 of FIG. 9. The capability report may indicate frequency layers that the UE supports performing positioning measurements using different non-PRS. The capability report may indicate that the UE supports performing positioning measurements using different non-PRS in a frequency layer. The capability report may indicate whether the UE supports reporting measurement information in a single measurement report for positioning measurements generated using different types of non-PRS. A means for receiving a capability report from the UE, the capability report indicates that the UE is capable of performing positioning measurements using non-PRS may include, e.g., the external interface 1110 and one or more processors 1102 with dedicated hardware or implementing executable code or software instructions in memory 1104 and/or medium 1120, such as the positioning session module 1122 and the non-PRS module 1124, in location server 1100 shown in FIG. 11.

Figure 15:
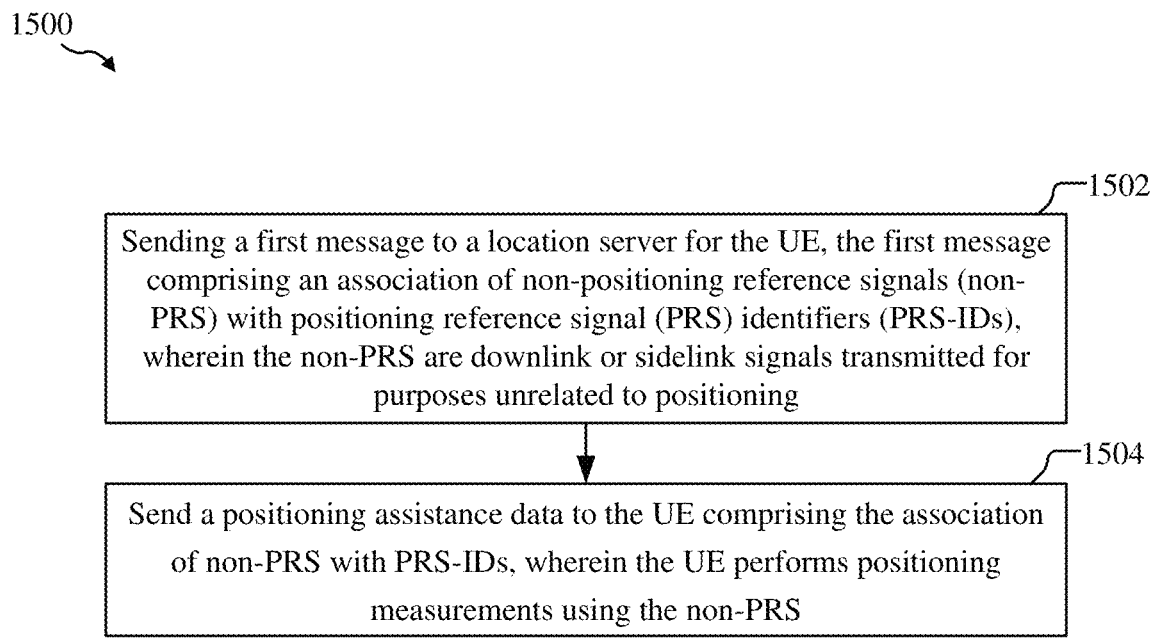
FIG. 15 shows a flowchart for an exemplary method for supporting positioning of a base station in a wireless network performed by the UE.

FIG. 15 shows a flowchart for an exemplary method 1500 for supporting positioning of a user equipment (UE) in a wireless network performed by a serving base station for the UE in the wireless network, such as base station 102 shown in FIG. 1, in a manner consistent with disclosed implementation.

At block 1502, the base station sends a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning, e.g., as discussed in stage 5 of FIG. 9. For example, the non-PRS may include at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof. A means for sending a first message to a location server for the UE, the first message comprising an association of non-positioning reference signals (non-PRS)

with positioning reference signal (PRS) identifiers (PRS-IDs), wherein the non-PRS are downlink or sidelink signals transmitted for purposes unrelated to positioning may include, e.g., the wireless transceiver 1210 and one or more processors 1202 with dedicated hardware or implementing executable code or software instructions in memory 1204 and/or medium 1220, such as the positioning session module 1222 and the non-PRS module 1224, in base station 1300 shown in FIG. 13.

At block 1504, the base station sends a positioning assistance data to the UE comprising the association of non-PRS with PRS-IDs, wherein the UE performs positioning measurements using the non-PRS, e.g., as discussed at stage 6 of FIG. 9. A means for sending a positioning assistance data to the UE comprising the association of non-PRS with PRS-IDs, wherein the UE performs positioning measurements using the non-PRS may include, e.g., the wireless transceiver 1210 and one or more processors 1202 with dedicated hardware or implementing executable code or software instructions in memory 1204 and/or medium 1220, such as the positioning session module 1222 and the non-PRS module 1224, in base station 1300 shown in FIG. 13.

In implementations, the non-PRS may be configured within one or more dedicated resource sets which are separate from the resource sets that contain the configuration of PRS. The non-PRS may be configured within one or more dedicated frequency layers which are separate from the frequency layers that contain the configuration of PRS. The non-PRS may be configured within a same frequency layer as PRS. For example, the non-PRS and the PRS may have a same center frequency and numerology but differ in at least one of bandwidth, starting Physical Resource Block (start-PRB), and comb, or a combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a user equipment (UE) for supporting positioning of the UE in a wireless network, the method comprising: receiving positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; performing positioning measurements based on the positioning assistance data using the non-PRS; and sending a report of measurement information to a network node in the wireless network, the measurement information using the PRS-IDs associated with the non-PRS to identify the non-PRS used for the positioning measurements.

Clause 2. The method of clause 1, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

Clause 3. The method of either clauses 1 or 2, wherein the positioning assistance data is received from a location server.

Clause 4. The method of clause 3, wherein the non-PRS comprises a Synchronization Signal Block (SSB), and the PRS-ID associated with the SSB is provided in an SSB configuration information element.

Clause 5. The method of clause 3, wherein the non-PRS comprises a Tracking Reference Signal (TRS), and the PRS-ID associated with the TRS is provided in a TRS configuration information element.

Clause 6. The method of clause 3, wherein the non-PRS comprises a Channel State Information Reference Signal (CSI-RS), and the PRS-ID associated with the CSI-RS is provided in a CSI-RS configuration information element.

Clause 7. The method of clause 3, wherein the non-PRS comprises a Demodulation Reference Signal (DMRS), and the PRS-ID associated with the DMRS is provided in a DMRS configuration information element.

Clause 8. The method of clause 3, wherein the non-PRS comprises a Physical Downlink Control Channel (PDCSH), and the PRS-ID associated with the PDCSH is provided in a PDCSH configuration information element.

Clause 9. The method of clause 3, wherein the non-PRS comprises a Physical Downlink Shared Channel (PDSCH), and the PRS-ID associated with the PDSCH is provided in a PDSCH configuration information element which does not include time or frequency allocation of the PDSCH.

Clause 10. The method of clause 9, wherein the time or frequency allocation of the PDSCH is selected by a serving base station.

Clause 11. The method of any of clauses 1-10, wherein the association of the non-PRS with PRS-IDs in the positioning assistance data is received from a serving base station.

Clause 12. The method of any of clauses 1-11, wherein the non-PRS is configured within one or more dedicated resource sets in the positioning assistance data which are separate from resource sets that contain a configuration of PRS.

Clause 13. The method of any of clauses 1-12, wherein the non-PRS is configured within one or more dedicated frequency layers in the positioning assistance data which are separate from frequency layers that contain a configuration of PRS.

Clause 14. The method of any of clauses 1-13, wherein the second set of information related to the non-PRS in the positioning assistance data is configured within a same frequency layer as the first set of information related to the PRS.

Clause 15. The method of clause 14, wherein the non-PRS and the PRS have a same center frequency and numerology but differ in at least one of bandwidth, starting Physical Resource Block (startPRB), and comb, or a combination thereof.

Clause 16. The method of any of clauses 1-15, wherein the second set of information related to the non-PRS comprises sets of signals, each set of signals comprising non-PRS that belong to a same Physical channel Clause 17. The method of any of clauses 1-16, wherein the positioning measurements comprise a first Reference Signal Time Difference (RSTD) measurement, and wherein the non-PRS used for the first RSTD measurement are a first type of non-PRS.

Clause 18. The method of clause 17, wherein the positioning measurements comprise a second RSTD measurement, and wherein the non-PRS used for the second RSTD measurement are a second type of non-PRS, wherein the first type of non-PRS is different than the second type of non-PRS.

Clause 19. The method of any of clauses 1-18, wherein the positioning measurements comprise a plurality of receive time minus transmission time (Rx-Tx) measurements, and wherein different types of non-PRS are used for the Rx-Tx measurements.

Clause 20. The method of any of clauses 1-19, further comprising providing a capability report to the network node, the capability report indicates that the UE is capable of performing positioning measurements using the non-PRS.

Clause 21. The method of clause 20, wherein the capability report indicates frequency layers that the UE supports performing positioning measurements using different non-PRS.

Clause 22. The method of clause 20, wherein the capability report indicates that the UE supports performing positioning measurements using different non-PRS in a frequency layer.

Clause 23. The method of clause 20, wherein the capability report indicates whether the UE supports reporting measurement information in a single report for positioning measurements generated using different types of non-PRS.

Clause 24. The method of any of clauses 1-23, wherein the positioning assistance data defines different accuracy and different period requirements for positioning measurements generated using different types of non-PRS.

Clause 25. A user equipment (UE) configured to support positioning of the UE in a wireless network, comprising: a wireless transceiver configured to wirelessly communicate with entities in the wireless network; at least one memory; at least one processor coupled to the wireless transceiver and the at least one memory, wherein the at least one processor is configured to: receive positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; perform positioning measurements based on the positioning assistance data using the non-PRS; and send a report of measurement information to a network node in the wireless network, the measurement information using the PRS-IDs associated with the non-PRS to identify the non-PRS used for the positioning measurements.

Clause 26. The UE of clause 25, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

Clause 27. The UE of either of clauses 25 or 26, wherein the positioning assistance data is received from a location server.

Clause 28. The UE of clause 27, wherein the non-PRS comprises a Synchronization Signal Block (SSB), and the PRS-ID associated with the SSB is provided in an SSB configuration information element.

Clause 29. The UE of clause 27, wherein the non-PRS comprises a Tracking Reference Signal (TRS), and the PRS-ID associated with the TRS is provided in a TRS configuration information element.

Clause 30. The UE of clause 27, wherein the non-PRS comprises a Channel State Information Reference Signal (CSI-RS), and the PRS-ID associated with the CSI-RS is provided in a CSI-RS configuration information element.

Clause 31. The UE of clause 27, wherein the non-PRS comprises a Demodulation Reference Signal (DMRS), and the PRS-ID associated with the DMRS is provided in a DMRS configuration information element.

Clause 32. The UE of clause 27, wherein the non-PRS comprises a Physical Downlink Control Channel (PDCSH), and the PRS-ID associated with the PDCSH is provided in a PDCSH configuration information element.

Clause 33. The UE of clause 27, wherein the non-PRS comprises a Physical Downlink Shared Channel (PDSCH), and the PRS-ID associated with the PDSCH is provided in a PDSCH configuration information element which does not include time or frequency allocation of the PDSCH.

Clause 34. The UE of clause 33, wherein the time or frequency allocation of the PDSCH is selected by a serving base station.

Clause 35. The UE of any of clauses 25-34, wherein the association of the non-PRS with PRS-IDs in the positioning assistance data is received from a serving base station.

Clause 36. The UE of any of clauses 25-35, wherein the non-PRS is configured within one or more dedicated resource sets in the positioning assistance data which are separate from resource sets that contain a configuration of PRS.

Clause 37. The UE of any of clauses 25-36, wherein the non-PRS is configured within one or more dedicated frequency layers in the positioning assistance data which are separate from frequency layers that contain a configuration of PRS.

Clause 38. The UE of any of clauses 25-37, wherein the second set of information related to the non-PRS in the positioning assistance data is configured within a same frequency layer as the first set of information related to the PRS.

Clause 39. The UE of clause 38, wherein the non-PRS and the PRS have a same center frequency and numerology but differ in at least one of bandwidth, starting Physical Resource Block (startPRB), and comb, or a combination thereof.

Clause 40. The UE of any of clauses 25-39, wherein the second set of information related to the non-PRS comprises sets of signals, each set of signals comprising non-PRS that belong to a same Physical channel Clause 41. The UE of any of clauses 25-40, wherein the positioning measurements comprise a first Reference Signal Time Difference (RSTD) measurement, and wherein the non-PRS used for the first RSTD measurement are a first type of non-PRS.

Clause 42. The UE of clause 41, wherein the positioning measurements comprise a second RSTD measurement, and wherein the non-PRS used for the second RSTD measurement are a second type of non-PRS, wherein the first type of non-PRS is different than the second type of non-PRS.

Clause 43. The UE of any of clauses 25-42, wherein the positioning measurements comprise a plurality of receive time minus transmission time (Rx-Tx) measurements, and wherein different types of non-PRS are used for the Rx-Tx measurements.

Clause 44. The UE of any of clauses 25-43, wherein the at least one processor is further configured to provide a capability report to the network node, the capability report indicates that the UE is capable of performing positioning measurements using the non-PRS.

Clause 45. The UE of clause 44, wherein the capability report indicates frequency layers that the UE supports performing positioning measurements using different non-PRS.

Clause 46. The UE of clause 44, wherein the capability report indicates that the UE supports performing positioning measurements using different non-PRS in a frequency layer.

Clause 47. The UE of clause 44, wherein the capability report indicates whether the UE supports reporting measurement information in a single report for positioning measurements generated using different types of non-PRS.

Clause 48. The UE of any of clauses 25-47, wherein the positioning assistance data defines different accuracy and different period requirements for positioning measurements generated using different types of non-PRS.

Clause 49. A user equipment (UE) configured for supporting positioning of the UE in a wireless network, comprising: means for receiving positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; means for performing positioning measurements based on the positioning assistance data using the non-PRS; and means for sending a report of measurement information to a network node in the wireless network, the measurement information using the PRS-IDs associated with the non-PRS to identify the non-PRS used for the positioning measurements.

Clause 50. A non-transitory computer-readable storage medium including program code stored thereon, the program code is operable to configure at least one processor in a user equipment (UE) for supporting positioning of the UE in a wireless network, the program code comprising instructions to: receive positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs; perform positioning measurements based on the positioning assistance data using the non-PRS; and send a report of measurement information to a network node in the wireless network, the measurement information using the PRS-IDs associated with the non-PRS to identify the non-PRS used for the positioning measurements.

Clause 51. A method performed by a location server in wireless network for supporting positioning of a user equipment (UE) the wireless network, the method comprising: obtaining a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and receiving a report of measurement information from the UE, the measurement information using the PRS-IDs associated with the non-PRS to identify the non-PRS used for the positioning measurements performed by the UE.

Clause 52. The method of clause 51, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

Clause 53. The method of either of clauses 51 or 52, wherein the list of PRS-IDs and the association of the non-PRS with the PRS-IDs is obtained as positioning assistance data generated by the location server, the method further comprising sending the positioning assistance data to the UE.

Clause 54. The method of clause 53, wherein the positioning assistance data defines different accuracy and different period requirements for positioning measurements generated using different types of non-PRS.

Clause 55. The method of either of clauses 53 or 54, wherein the non-PRS comprises a Synchronization Signal Block (SSB), and the PRS-ID associated with the SSB is provided in an SSB configuration information element.

Clause 56. The method of either of clauses 53 or 54, wherein the non-PRS comprises a Tracking Reference Signal (TRS), and the PRS-ID associated with the TRS is provided in a TRS configuration information element.

Clause 57. The method of either of clauses 53 or 54, wherein the non-PRS comprises a Channel State Information Reference Signal (CSI-RS), and the PRS-ID associated with the CSI-RS is provided in a CSI-RS configuration information element.

Clause 58. The method of either of clauses 53 or 54, wherein the non-PRS comprises a Demodulation Reference Signal (DMRS), and the PRS-ID associated with the DMRS is provided in a DMRS configuration information element.

Clause 59. The method of either of clauses 53 or 54, wherein the non-PRS comprises a Physical Downlink Control Channel (PDCSH), and the PRS-ID associated with the PDCSH is provided in a PDCSH configuration information element.

Clause 60. The method of either of clauses 53 or 54, wherein the non-PRS comprises a Physical Downlink Shared Channel (PDSCH), and the PRS-ID associated with the PDSCH is provided in a PDSCH configuration information element which does not include time or frequency allocation of the PDSCH.

Clause 61. The method of clause 60, wherein the time or frequency allocation of the PDSCH is selected by a serving base station.

Clause 62. The method of any of clauses 51-61, wherein the association of the non-PRS with the PRS-IDs is obtained from a serving base station for the UE, wherein the serving base station sends the association of the non-PRS with the PRS-IDs to the UE.

Clause 63. The method of any of clauses 51-62, wherein the non-PRS is configured within one or more dedicated resource sets in the positioning assistance data which are separate from resource sets that contain a configuration of PRS.

Clause 64. The method of any of clauses 51-63, wherein the non-PRS is configured within one or more dedicated frequency layers in the positioning assistance data which are separate from frequency layers that contain a configuration of PRS.

Clause 65. The method of any of clauses 51-64, wherein the second set of information related to the non-PRS in the positioning assistance data within a same frequency layer as the first set of information related to the PRS.

Clause 66. The method of clause 65, wherein the non-PRS and the PRS have a same center frequency and numerology but differ in at least one of bandwidth, starting Physical Resource Block (startPRB), and comb, or a combination thereof.

Clause 67. The method of any of clauses 51-66, wherein the second set of information related to the non-PRS comprises sets of signals, each set of signals comprising non-PRS that belong to a same Physical channel Clause 68. The method of any of clauses 51-67, wherein the positioning measurements comprise a first Reference Signal Time Difference (RSTD) measurement, and wherein the non-PRS used for the first RSTD measurement are a first type of non-PRS.

Clause 69. The method of clause 68, wherein the positioning measurements comprise a second RSTD measurement, and wherein the non-PRS used for the second RSTD measurement are a second type of non-PRS, wherein the first type of non-PRS is different than the second type of non-PRS.

Clause 70. The method of any of clauses 51-69, wherein the positioning measurements comprise a plurality of receive time minus transmission time (Rx-Tx) measurements, and wherein different types of non-PRS are used for the Rx-Tx measurements.

Clause 71. The method of any of clauses 51-70, further comprising receiving a capability report from the UE, the capability report indicates that the UE is capable of performing positioning measurements using the non-PRS.

Clause 72. The method of clause 71, wherein the capability report indicates frequency layers that the UE supports performing positioning measurements using different non-PRS.

Clause 73. The method of clause 71, wherein the capability report indicates that the UE supports performing positioning measurements using different non-PRS in a frequency layer.

Clause 74. The method of clause 71, wherein the capability report indicates whether the UE supports reporting measurement information in a single measurement report for positioning measurements generated using different types of non-PRS.

Clause 75. A location server configured to support positioning of a user equipment (UE) in a wireless network, comprising: an external interface configured to communicate with entities in the wireless network; at least one memory; at least one processor coupled to the external interface and the at least one memory, wherein the at least one processor is configured to: obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and receive a report of measurement information from the UE, the measurement information using the PRS-IDs associated with the non-PRS to identify the non-PRS used for the positioning measurements performed by the UE.

Clause 76. The location server of clause 75, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

Clause 77. The location server of either of clauses 75 or 76, wherein the list of PRS-IDs and the association of the non-PRS with the PRS-IDs is obtained as positioning assistance data generated by the location server, wherein the at least one processor is further configured to send the positioning assistance data to the UE.

Clause 78. The location server of clause 77, wherein the positioning assistance data defines different accuracy and different period requirements for positioning measurements generated using different types of non-PRS.

Clause 79. The location server of either of clauses 77 or 78, wherein the non-PRS comprises a Synchronization Signal Block (SSB), and the PRS-ID associated with the SSB is provided in an SSB configuration information element.

Clause 80. The location server of either of clauses 77 or 78, wherein the non-PRS comprises a Tracking Reference Signal (TRS), and the PRS-ID associated with the TRS is provided in a TRS configuration information element.

Clause 81. The location server of either of clauses 77 or 78, wherein the non-PRS comprises a Channel State Information Reference Signal (CSI-RS), and the PRS-ID associated with the CSI-RS is provided in a CSI-RS configuration information element.

Clause 82. The location server of either of clauses 77 or 78, wherein the non-PRS comprises a Demodulation Reference Signal (DMRS), and the PRS-ID associated with the DMRS is provided in a DMRS configuration information element.

Clause 83. The location server of either of clauses 77 or 78, wherein the non-PRS comprises a Physical Downlink Control Channel (PDCSH), and the PRS-ID associated with the PDCSH is provided in a PDCSH configuration information element.

Clause 84. The location server of either of clauses 77 or 78, wherein the non-PRS comprises a Physical Downlink Shared Channel (PDSCH), and the PRS-ID associated with the PDSCH is provided in a PDSCH configuration information element which does not include time or frequency allocation of the PDSCH.

Clause 85. The location server of clause 84, wherein the time or frequency allocation of the PDSCH is selected by a serving base station.

Clause 86. The location server of any of clauses 75-85, wherein the association of the non-PRS with the PRS-IDs is obtained from a serving base station for the UE, wherein the serving base station sends the association of the non-PRS with the PRS-IDs to the UE.

Clause 87. The location server of any of clauses 75-86, wherein the non-PRS is configured within one or more dedicated resource sets in the positioning assistance data which are separate from resource sets that contain a configuration of PRS.

Clause 88. The location server of any of clauses 75-87, wherein the non-PRS is configured within one or more dedicated frequency layers in the positioning assistance data which are separate from frequency layers that contain a configuration of PRS.

Clause 89. The location server of any of clauses 75-88, wherein the second set of information related to the non-PRS in the positioning assistance data within a same frequency layer as the first set of information related to the PRS.

Clause 90. The location server of clause 89, wherein the non-PRS and the PRS have a same center frequency and numerology but differ in at least one of bandwidth, starting Physical Resource Block (startPRB), and comb, or a combination thereof.

Clause 91. The location server of any of clauses 75-90, wherein the second set of information related to the non-PRS comprises sets of signals, each set of signals comprising non-PRS that belong to a same Physical channel Clause 92. The location server of any of clauses 75-91, wherein the positioning measurements comprise a first Reference Signal Time Difference (RSTD) measurement, and wherein the non-PRS used for the first RSTD measurement are a first type of non-PRS.

Clause 93. The location server of clause 92, wherein the positioning measurements comprise a second RSTD measurement, and wherein the non-PRS used for the second RSTD measurement are a second type of non-PRS, wherein the first type of non-PRS is different than the second type of non-PRS.

Clause 94. The location server of any of clauses 75-93, wherein the positioning measurements comprise a plurality of receive time minus transmission time (Rx-Tx) measurements, and wherein different types of non-PRS are used for the Rx-Tx measurements.

Clause 95. The location server of any of clauses 75-94, wherein the at least one processor is further configured to receive a capability report from the UE, the capability report indicates that the UE is capable of performing positioning measurements using the non-PRS.

Clause 96. The location server of clause 95, wherein the capability report indicates frequency layers that the UE supports performing positioning measurements using different non-PRS.

Clause 97. The location server of clause 95, wherein the capability report indicates that the UE supports performing positioning measurements using different non-PRS in a frequency layer.

Clause 98. The location server of clause 95, wherein the capability report indicates whether the UE supports reporting measurement information in a single measurement report for positioning measurements generated using different types of non-PRS.

Clause 99. A location server in wireless network for supporting positioning of a user equipment (UE) the wireless network, comprising: means for obtaining a first set of information related to positioning reference signals (PRS) and a second set of information related to non-positioning reference signals (non-PRS), a list of PRS identifiers (PRS- IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and means for receiving a report of measurement information from the UE, the measurement information using the PRS-IDs associated with the non-PRS to identify the non-PRS used for the positioning measurements performed by the UE.

Clause 100. A non-transitory computer-readable storage medium including program code stored thereon, the program code is operable to configure at least one processor in a location server in wireless network for supporting positioning of a user equipment (UE) the wireless network, the program code comprising instructions to: obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and receive a report of measurement information from the UE, the measurement information using the PRS-IDs associated with the non-PRS to identify the non-PRS used for the positioning measurements performed by the UE.

Clause 101. A method performed by a serving base station for a user equipment (UE) in a wireless network for supporting positioning of the UE in the wireless network, the method comprising: sending a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and sending a positioning assistance data to the UE comprising the association of non-PRS with PRS-IDs, wherein the UE performs positioning measurements using the non-PRS.

Clause 102. The method of clause 101, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

Clause 103. The method of either of clauses 101 or 102, wherein the non-PRS is configured within one or more dedicated resource sets which are separate from resource sets that contain a configuration of PRS.

Clause 104. The method of any of clauses 101-103, wherein the non-PRS is configured within one or more dedicated frequency layers which are separate from frequency layers that contain a configuration of PRS.

Clause 105. The method of any of clauses 101-104, wherein the non-PRS is configured within a same frequency layer as PRS.

Clause 106. The method of clause 105, wherein the non-PRS and the PRS have a same center frequency and numerology but differ in at least one of bandwidth, starting Physical Resource Block (startPRB), and comb, or a combination thereof.

Clause 107. A base station configured to support positioning of a user equipment (UE) in a wireless network, comprising: an external interface configured to wirelessly communicate with entities in the wireless network; at least one memory; at least one processor coupled to the external interface and the at least one memory, wherein the at least one processor is configured to: send a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and send a positioning assistance data to the UE comprising the association of non-PRS with PRS-IDs, wherein the UE performs positioning measurements using the non-PRS.

Clause 108. The base station of clause 107, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

Clause 109. The base station of either of clauses 107 or 108, wherein the non-PRS is configured within one or more dedicated resource sets which are separate from resource sets that contain a configuration of PRS.

Clause 110. The base station of any of clauses 107-109, wherein the non-PRS is configured within one or more dedicated frequency layers which are separate from frequency layers that contain a configuration of PRS.

Clause 111. The base station of any of clauses 107-110, wherein the non-PRS is configured within a same frequency layer as PRS.

Clause 112. The base station of clause 111, wherein the non-PRS and the PRS have a same center frequency and numerology but differ in at least one of bandwidth, starting Physical Resource Block (startPRB), and comb, or a combination thereof.

Clause 113. A serving base station for a user equipment (UE) in a wireless network for supporting positioning of the UE in the wireless network, comprising: means for sending a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and means for sending a positioning assistance data to the UE comprising the association of non-PRS with PRS-IDs, wherein the UE performs positioning measurements using the non-PRS.

Clause 114. A non-transitory computer-readable storage medium including program code stored thereon, the program code is operable to configure at least one processor in a serving base station for a user equipment (UE) in a wireless network for supporting positioning of the UE in the wireless network, the program code comprising instructions to: send a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and send a positioning assistance data to the UE comprising the association of non-PRS with PRS-IDs, wherein the UE performs positioning measurements using the non-PRS.

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for supporting positioning of the UE in a wireless network, the method comprising:
receiving positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs;
performing positioning measurements based on the positioning assistance data using the non-PRS; and
sending a report of measurement information to a network node in the wireless network, the measurement information using the PRS-IDs associated with the non-PRS to identify the non-PRS used for the positioning measurements.

2. The method of claim 1, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

3. The method of claim 1, wherein the positioning assistance data is received from a location server, and the non-PRS comprises one of:
a Synchronization Signal Block (SSB), and the PRS-ID associated with the SSB is provided in an SSB configuration information element; or
a Tracking Reference Signal (TRS), and the PRS-ID associated with the TRS is provided in a TRS configuration information element; or
a Channel State Information Reference Signal (CSI-RS), and the PRS-ID associated with the CSI-RS is provided in a CSI-RS configuration information element;
a Demodulation Reference Signal (DMRS), and the PRS-ID associated with the DMRS is provided in a DMRS configuration information element; or
a Physical Downlink Control Channel (PDCSH), and the PRS-ID associated with the PDCSH is provided in a PDCSH configuration information element; or
a Physical Downlink Shared Channel (PDSCH), and the PRS-ID associated with the PDSCH is provided in a PDSCH configuration information element which does not include time or frequency allocation of the PDSCH.

4. The method of claim 3, wherein the non-PRS comprises the PDSCH and wherein the time or frequency allocation of the PDSCH is selected by a serving base station.

5. The method of claim 1, wherein the association of the non-PRS with PRS-IDs in the positioning assistance data is received from a serving base station.

6. The method of claim 1, wherein the non-PRS is configured within one or more dedicated resource sets in the positioning assistance data which are separate from resource sets that contain a configuration of PRS.

7. The method of claim 1, wherein the non-PRS is configured within one or more dedicated frequency layers in the positioning assistance data which are separate from frequency layers that contain a configuration of PRS.

8. The method of claim 1, wherein the second set of information related to the non-PRS in the positioning assistance data is configured within a same frequency layer as the first set of information related to the PRS.

9. The method of claim 8, wherein the non-PRS and the PRS have a same center frequency and numerology but differ in at least one of bandwidth, starting Physical Resource Block (startPRB), and comb, or a combination thereof.

10. The method of claim 1, wherein the second set of information related to the non-PRS comprises sets of signals, each set of signals comprising non-PRS that belong to a same Physical channel.

11. The method of claim 1, wherein the positioning measurements comprise a first Reference Signal Time Difference (RSTD) measurement, and wherein the non-PRS used for the first RSTD measurement are a first type of non-PRS.

12. The method of claim 11, wherein the positioning measurements comprise a second RSTD measurement, and wherein the non-PRS used for the second RSTD measurement are a second type of non-PRS, wherein the first type of non-PRS is different than the second type of non-PRS.

13. The method of claim 1, wherein the positioning measurements comprise a plurality of receive time minus transmission time (Rx-Tx) measurements, and wherein different types of non-PRS are used for the Rx-Tx measurements.

14. The method of claim 1, further comprising providing a capability report to the network node, the capability report indicates that the UE is capable of performing positioning measurements using the non-PRS, and wherein the capability report indicates at least one of:
frequency layers that the UE supports performing positioning measurements using different non-PRS;
the UE supports performing positioning measurements using different non-PRS in a frequency layer;
whether the UE supports reporting measurement information in a single report for positioning measurements generated using different types of non-PRS.

15. The method of claim 1, wherein the positioning assistance data defines different accuracy and different period requirements for positioning measurements generated using different types of non-PRS.

16. A user equipment (UE) configured to support positioning of the UE in a wireless network, comprising:
a wireless transceiver configured to wirelessly communicate with entities in the wireless network;
at least one memory;
at least one processor coupled to the wireless transceiver and the at least one memory, wherein the at least one processor is configured to:
receive positioning assistance data comprising a first set of information related to positioning reference signals (PRS) and a second set of information related to non-positioning reference signals (non-PRS), wherein the non-PRS are downlink or sidelink signals transmitted for purposes unrelated to positioning, the positioning assistance data further comprises a list of PRS identifiers (PRS-IDs), wherein the non-PRS is associated with PRS-IDs;
perform positioning measurements based on the positioning assistance data using the non-PRS; and
send a report of measurement information to a network node in the wireless network, the measurement information using the PRS-IDs associated with the non-PRS to identify the non-PRS used for the positioning measurements.

17. The UE of claim 16, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

18. The UE of claim 16, wherein the positioning assistance data is received from a location server, and the non-PRS comprises one of:
   a Synchronization Signal Block (SSB), and the PRS-ID associated with the SSB is provided in an SSB configuration information element; or
   a Tracking Reference Signal (TRS), and the PRS-ID associated with the TRS is provided in a TRS configuration information element; or
   a Channel State Information Reference Signal (CSI-RS), and the PRS-ID associated with the CSI-RS is provided in a CSI-RS configuration information element;
   a Demodulation Reference Signal (DMRS), and the PRS-ID associated with the DMRS is provided in a DMRS configuration information element; or
   a Physical Downlink Control Channel (PDCSH), and the PRS-ID associated with the PDCSH is provided in a PDCSH configuration information element; or
   a Physical Downlink Shared Channel (PDSCH), and the PRS-ID associated with the PDSCH is provided in a PDSCH configuration information element which does not include time or frequency allocation of the PDSCH.

19. The UE of claim 18, wherein the non-PRS comprises the PDSCH and wherein the time or frequency allocation of the PDSCH is selected by a serving base station.

20. The UE of claim 16, wherein the association of the non-PRS with PRS-IDs in the positioning assistance data is received from a serving base station.

21. The UE of claim 16, wherein the non-PRS is configured within one or more dedicated resource sets in the positioning assistance data which are separate from resource sets that contain a configuration of PRS.

22. The UE of claim 16, wherein the non-PRS is configured within one or more dedicated frequency layers in the positioning assistance data which are separate from frequency layers that contain a configuration of PRS.

23. The UE of claim 16, wherein the second set of information related to the non-PRS in the positioning assistance data is configured within a same frequency layer as the first set of information related to the PRS.

24. The UE of claim 23, wherein the non-PRS and the PRS have a same center frequency and numerology but differ in at least one of bandwidth, starting Physical Resource Block (startPRB), and comb, or a combination thereof.

25. The UE of claim 16, wherein the second set of information related to the non-PRS comprises sets of signals, each set of signals comprising non-PRS that belong to a same Physical channel.

26. The UE of claim 16, wherein the positioning measurements comprise a first Reference Signal Time Difference (RSTD) measurement, and wherein the non-PRS used for the first RSTD measurement are a first type of non-PRS.

27. The UE of claim 26, wherein the positioning measurements comprise a second RSTD measurement, and wherein the non-PRS used for the second RSTD measurement are a second type of non-PRS, wherein the first type of non-PRS is different than the second type of non-PRS.

28. The UE of claim 16, wherein the positioning measurements comprise a plurality of receive time minus transmission time (Rx-Tx) measurements, and wherein different types of non-PRS are used for the Rx-Tx measurements.

29. The UE of claim 16, wherein the at least one processor is further configured to provide a capability report to the network node, the capability report indicates that the UE is capable of performing positioning measurements using the non-PRS, and wherein the capability report indicates at least one of:
   frequency layers that the UE supports performing positioning measurements using different non-PRS;
   the UE supports performing positioning measurements using different non-PRS in a frequency layer;
   whether the UE supports reporting measurement information in a single report for positioning measurements generated using different types of non-PRS.

30. The UE of claim 16, wherein the positioning assistance data defines different accuracy and different period requirements for positioning measurements generated using different types of non-PRS.

31. A method performed by a location server in wireless network for supporting positioning of a user equipment (UE) the wireless network, the method comprising:
   obtaining a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and
   receiving a report of measurement information from the UE, the measurement information using the PRS-IDs associated with the non-PRS to identify the non-PRS used for the positioning measurements performed by the UE.

32. The method of claim 31, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

33. The method of claim 31, wherein the list of PRS-IDs and the association of the non-PRS with the PRS-IDs is obtained as positioning assistance data generated by the location server, the method further comprising sending the positioning assistance data to the UE, and the non-PRS comprises one of:
   a Synchronization Signal Block (SSB), and the PRS-ID associated with the SSB is provided in an SSB configuration information element; or
   a Tracking Reference Signal (TRS), and the PRS-ID associated with the TRS is provided in a TRS configuration information element; or
   a Channel State Information Reference Signal (CSI-RS), and the PRS-ID associated with the CSI-RS is provided in a CSI-RS configuration information element;
   a Demodulation Reference Signal (DMRS), and the PRS-ID associated with the DMRS is provided in a DMRS configuration information element; or a Physical Downlink Control Channel (PDCSH), and the PRS-ID associated with the PDCSH is provided in a PDCSH configuration information element; or a Physical Downlink Shared Channel (PDSCH), and the PRS-ID associated with the PDSCH is provided in a PDSCH configuration information element which does not include time or frequency allocation of the PDSCH.

34. The method of claim 33, wherein the positioning assistance data defines different accuracy and different period requirements for positioning measurements generated using different types of non-PRS.

35. The method of claim 33, wherein the non-PRS comprises the PDSCH and wherein the time or frequency allocation of the PDSCH is selected by a serving base station.

36. The method of claim 31, wherein the association of the non-PRS with the PRS-IDs is obtained from a serving base station for the UE, wherein the serving base station sends the association of the non-PRS with the PRS-IDs to the UE.

37. The method of claim 31, wherein the non-PRS is configured within one or more dedicated resource sets in the positioning assistance data which are separate from resource sets that contain a configuration of PRS.

38. The method of claim 31, wherein the non-PRS is configured within one or more dedicated frequency layers in the positioning assistance data which are separate from frequency layers that contain a configuration of PRS.

39. The method of claim 31, wherein the second set of information related to the non-PRS in the positioning assistance data within a same frequency layer as the first set of information related to the PRS.

40. The method of claim 39, wherein the non-PRS and the PRS have a same center frequency and numerology but differ in at least one of bandwidth, starting Physical Resource Block (startPRB), and comb, or a combination thereof.

41. The method of claim 31, wherein the second set of information related to the non-PRS comprises sets of signals, each set of signals comprising non-PRS that belong to a same Physical channel.

42. The method of claim 31, wherein the positioning measurements comprise a first Reference Signal Time Difference (RSTD) measurement, and wherein the non-PRS used for the first RSTD measurement are a first type of non-PRS.

43. The method of claim 42, wherein the positioning measurements comprise a second RSTD measurement, and wherein the non-PRS used for the second RSTD measurement are a second type of non-PRS, wherein the first type of non-PRS is different than the second type of non-PRS.

44. The method of claim 31, wherein the positioning measurements comprise a plurality of receive time minus transmission time (Rx-Tx) measurements, and wherein different types of non-PRS are used for the Rx-Tx measurements.

45. The method of claim 31, further comprising receiving a capability report from the UE, the capability report indicates that the UE is capable of performing positioning measurements using the non-PRS, and wherein the capability report indicates at least one of:

frequency layers that the UE supports performing positioning measurements using different non-PRS;
the UE supports performing positioning measurements using different non-PRS in a frequency layer;
whether the UE supports reporting measurement information in a single report for positioning measurements generated using different types of non-PRS.

46. A location server configured to support positioning of a user equipment (UE) in a wireless network, comprising:
an external interface configured to communicate with entities in the wireless network;
at least one memory;
at least one processor coupled to the external interface and the at least one memory, wherein the at least one processor is configured to:
obtain a first set of information related to positioning reference signals (PRS) and a second set of information related to non-positioning reference signals (non-PRS), a list of PRS identifiers (PRS-IDs) and an association of the non-PRS with the PRS-IDs, wherein the non-PRS are downlink or sidelink signals transmitted for purposes unrelated to positioning, wherein the UE receives the association of the non-PRS with the PRS-IDs and performs downlink positioning measurements using the non-PRS; and
receive a report of measurement information from the UE, the measurement information using the PRS-IDs associated with the non-PRS to identify the non-PRS used for the positioning measurements performed by the UE.

47. The location server of claim 46, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

48. The location server of claim 46, wherein the list of PRS-IDs and the association of the non-PRS with the PRS-IDs is obtained as positioning assistance data generated by the location server, wherein the at least one processor is further configured to send the positioning assistance data to the UE, and the non-PRS comprises one of:

a Synchronization Signal Block (SSB), and the PRS-ID associated with the SSB is provided in an SSB configuration information element; or a Tracking Reference Signal (TRS), and the PRS-ID associated with the TRS is provided in a TRS configuration information element; or a Channel State Information Reference Signal (CSI-RS), and the PRS-ID associated with the CSI-RS is provided in a CSI-RS configuration information element;

a Demodulation Reference Signal (DMRS), and the PRS-ID associated with the DMRS is provided in a DMRS configuration information element; or a Physical Downlink Control Channel (PDCSH), and the PRS-ID associated with the PDCSH is provided in a PDCSH configuration information element; or a Physical Downlink Shared Channel (PDSCH), and the PRS-ID associated with the PDSCH is provided in a PDSCH configuration information element which does not include time or frequency allocation of the PDSCH.

49. The location server of claim 48, wherein the positioning assistance data defines different accuracy and different period requirements for positioning measurements generated using different types of non-PRS.

50. The location server of claim 48, wherein the non-PRS comprises the PDSCH and wherein the time or frequency allocation of the PDSCH is selected by a serving base station.

51. The location server of claim 46, wherein the association of the non-PRS with the PRS-IDs is obtained from a serving base station for the UE, wherein the serving base station sends the association of the non-PRS with the PRS-IDs to the UE.

52. The location server of claim 46, wherein the non-PRS is configured within one or more dedicated resource sets in the positioning assistance data which are separate from resource sets that contain a configuration of PRS.

53. The location server of claim 46, wherein the non-PRS is configured within one or more dedicated frequency layers in the positioning assistance data which are separate from frequency layers that contain a configuration of PRS.

54. The location server of claim 46, wherein the second set of information related to the non-PRS in the positioning assistance data within a same frequency layer as the first set of information related to the PRS.

55. The location server of claim 54, wherein the non-PRS and the PRS have a same center frequency and numerology but differ in at least one of bandwidth, starting Physical Resource Block (startPRB), and comb, or a combination thereof.

56. The location server of claim 46, wherein the second set of information related to the non-PRS comprises sets of signals, each set of signals comprising non-PRS that belong to a same Physical channel.

57. The location server of claim 46, wherein the positioning measurements comprise a first Reference Signal Time Difference (RSTD) measurement, and wherein the non-PRS used for the first RSTD measurement are a first type of non-PRS.

58. The location server of claim 57, wherein the positioning measurements comprise a second RSTD measurement, and wherein the non-PRS used for the second RSTD measurement are a second type of non-PRS, wherein the first type of non-PRS is different than the second type of non-PRS.

59. The location server of claim 46, wherein the positioning measurements comprise a plurality of receive time minus transmission time (Rx-Tx) measurements, and wherein different types of non-PRS are used for the Rx-Tx measurements.

60. The location server of claim 46, wherein the at least one processor is further configured to receive a capability report from the UE, the capability report indicates that the UE is capable of performing positioning measurements using the non-PRS, and wherein the capability report indicates at least one of:
frequency layers that the UE supports performing positioning measurements using different non-PRS;
the UE supports performing positioning measurements using different non-PRS in a frequency layer;
whether the UE supports reporting measurement information in a single report for positioning measurements generated using different types of non-PRS.

61. A method performed by a serving base station for a user equipment (UE) in a wireless network for supporting positioning of the UE in the wireless network, the method comprising:
sending a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and
sending a positioning assistance data to the UE comprising the association of non-PRS with PRS-IDs, wherein the UE performs positioning measurements using the non-PRS.

62. The method of claim 61, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

63. The method of claim 61, wherein the non-PRS is configured within one or more dedicated resource sets which are separate from resource sets that contain a configuration of PRS.

64. The method of claim 61, wherein the non-PRS is configured within one or more dedicated frequency layers which are separate from frequency layers that contain a configuration of PRS.

65. The method of claim 61, wherein the non-PRS is configured within a same frequency layer as PRS.

66. The method of claim 65, wherein the non-PRS and the PRS have a same center frequency and numerology but differ in at least one of bandwidth, starting Physical Resource Block (startPRB), and comb, or a combination thereof.

67. A base station configured to support positioning of a user equipment (UE) in a wireless network, comprising:
an external interface configured to wirelessly communicate with entities in the wireless network;
at least one memory;
at least one processor coupled to the external interface and the at least one memory, wherein the at least one processor is configured to:
send a first message to a location server for the UE, the first message comprising an association of non-positioning reference signals (non-PRS) with positioning reference signal (PRS) identifiers (PRS-IDs), wherein the non-PRS are downlink or sidelink signals transmitted for purposes unrelated to positioning; and
send a positioning assistance data to the UE comprising the association of non-PRS with PRS-IDs, wherein the UE performs positioning measurements using the non-PRS.

68. The base station of claim 67, wherein the non-PRS comprise at least one of Synchronization Signal Block (SSB), Tracking Reference Signal (TRS), Channel State Information Reference Signal (CSI-RS), and Physical Downlink Shared Channel (PDSCH), Demodulation Reference Signal (DMRS), Physical Downlink Control Channel (PDCCH), Physical Sidelink Shared Channel (PSSCH), Physical Sidelink Control Channel (PSCCH), or a combination thereof.

69. The base station of claim 67, wherein the non-PRS is configured within one or more dedicated resource sets which are separate from resource sets that contain a configuration of PRS.

70. The base station of claim 67, wherein the non-PRS is configured within one or more dedicated frequency layers which are separate from frequency layers that contain a configuration of PRS.

71. The base station of claim 67, wherein the non-PRS is configured within a same frequency layer as PRS.

72. The base station of claim 71, wherein the non-PRS and the PRS have a same center frequency and numerology but differ in at least one of bandwidth, starting Physical Resource Block (startPRB), and comb, or a combination thereof.

\* \* \* \* \*